US011865708B2

(12) United States Patent
Abramson

(10) Patent No.: US 11,865,708 B2
(45) Date of Patent: *Jan. 9, 2024

(54) DOMESTIC ROBOTIC SYSTEM

(71) Applicant: MTD PRODUCTS INC, Valley City, OH (US)

(72) Inventor: Shai Abramson, Halutz (IL)

(73) Assignee: MTD PRODUCTS INC, Valley City, OH (US)

( * ) Notice: Subject to any disclaimer, the term of this patent is extended or adjusted under 35 U.S.C. 154(b) by 1002 days.

This patent is subject to a terminal disclaimer.

(21) Appl. No.: 16/425,231

(22) Filed: May 29, 2019

(65) Prior Publication Data

US 2019/0275666 A1 Sep. 12, 2019

Related U.S. Application Data

(63) Continuation of application No. 15/299,867, filed on Oct. 21, 2016, now Pat. No. 10,315,306.

(30) Foreign Application Priority Data

Oct. 21, 2015 (GB) ..................................... 1518652

(51) Int. Cl.
  *B25J 9/00* (2006.01)
  *G05D 1/02* (2020.01)
  *B25J 9/16* (2006.01)

(52) U.S. Cl.
  CPC ........... *B25J 9/0003* (2013.01); *B25J 9/1697* (2013.01); *G05D 1/0225* (2013.01);
  (Continued)

(58) Field of Classification Search
  CPC ..... B25J 9/0003; B25J 9/1697; G05D 1/0221; G05D 1/0225; G05D 1/0234;
  (Continued)

(56) References Cited

U.S. PATENT DOCUMENTS

| 5,911,767 A | 6/1999 | Garibotto |
| 9,719,801 B1 | 8/2017 | Ferguson |

(Continued)

FOREIGN PATENT DOCUMENTS

| EP | 0706105 A1 | 4/1996 |
| GB | 2513912 A | 11/2014 |
| WO | 2004059900 A2 | 7/2004 |

OTHER PUBLICATIONS

Oscar C. Barawid, Akira Mizushima, Kazunobu Ishii, Noboru Noguchi, Development of an Autonomous Navigation System using a Two-dimensional Laser Scanner in an Orchard Application, Biosystems Engineering, vol. 96, Issue 2, 2007, pp. 139-149, ISSN 1537-5110, Accessed Apr. 20, 2022.*

(Continued)

*Primary Examiner* — Jeff A Burke
*Assistant Examiner* — Blake A Wood
(74) *Attorney, Agent, or Firm* — WEGMAN, HESSLER, VALORE

(57) ABSTRACT

A domestic robotic system includes a moveable robot having an image obtaining device for obtaining images of the exterior environment of the robot, and a processor programmed to detect a predetermined pattern within the obtained images. The processor and image obtaining device form at least part of a first navigation system for the robot which can determine a first estimate of at least one of the position and orientation of the robot. A second navigation system for the robot determines an alternative estimate of the at least one of the position and orientation of the robot. Calibration of the second navigation system can be performed using the first navigation system.

20 Claims, 18 Drawing Sheets

(52) U.S. Cl.
CPC ......... *G05D 1/0234* (2013.01); *G05D 1/0246* (2013.01); *G05D 1/0278* (2013.01); *G05D 2201/0203* (2013.01); *G05D 2201/0208* (2013.01); *G05D 2201/0215* (2013.01)

(58) Field of Classification Search
CPC ............... G05D 1/0246; G05D 1/0278; G05D 2201/0203; G05D 2201/0208; G05D 2201/0215
See application file for complete search history.

(56) References Cited

U.S. PATENT DOCUMENTS

| | | | |
|---|---|---|---|
| 2005/0246078 A1* | 11/2005 | Vercammen | G05D 1/0278 |
| | | | 701/28 |
| 2007/0021869 A1* | 1/2007 | Baek | G05D 1/0272 |
| | | | 700/245 |
| 2008/0195316 A1 | 8/2008 | Krishnaswamy | |
| 2010/0283832 A1 | 11/2010 | Lin | |
| 2012/0265391 A1 | 10/2012 | Letsky | |
| 2013/0038717 A1 | 2/2013 | Reynolds et al. | |
| 2013/0162824 A1 | 6/2013 | Sung et al. | |
| 2013/0218397 A1* | 8/2013 | Griffini | G05D 1/027 |
| | | | 701/26 |
| 2014/0100693 A1* | 4/2014 | Fong | B25J 11/0085 |
| | | | 700/253 |
| 2015/0115876 A1* | 4/2015 | Noh | H02J 7/0042 |
| | | | 320/107 |
| 2016/0091899 A1* | 3/2016 | Aldred | B60L 53/14 |
| | | | 901/1 |
| 2016/0338262 A1* | 11/2016 | Liu | B08B 13/00 |
| 2017/0344024 A1* | 11/2017 | Grufman | A01D 34/008 |
| 2018/0004200 A1* | 1/2018 | Gariepy | G05D 1/0011 |

OTHER PUBLICATIONS

Office Action dated Mar. 21, 2018 for related U.S. Appl. No. 15/299,867.
Office Action dated Sep. 17, 2018 for related U.S. Appl. No. 15/299,867.
Notice of Allowance dated Feb. 4, 2019 for related U.S. Appl. No. 15/299,867.
European Search Report dated Apr. 7, 2017 for related application EP16195173.6.

* cited by examiner

DOMESTIC ROBOTIC SYSTEM

CROSS REFERENCE TO RELATED APPLICATIONS

This application claims the priority filing benefit of U.S. patent application Ser. No. 15/299,867 filed Oct. 21, 2016, and United Kingdom Patent Application No. 1518652.1 filed Oct. 21, 2015, which are incorporated herein by reference in its entirety.

TECHNICAL FIELD

The present invention is directed to domestic robotic systems, and in particular to the use of navigation systems in such domestic robotic systems.

BACKGROUND

For a number of reasons, domestic robots such as robotic vacuum cleaners, lawnmowers and pool cleaners may need to determine their current position and/or orientation. For instance, such robots typically carry a payload (which may include one or more grass-cutting blades, vacuuming nozzles, rotating brushes etc., depending on the function that the payload is intended to provide) across a working area until adequately covered. That the robot is able to determine—with accuracy—its current position and/or orientation may be helpful in navigating within this working area. As an example, this may enable the robot to better ensure adequate coverage by the payload of the working area. As another example, this may enable the robot to better navigate to specific points in the working area. A specific example of this is navigation to a base station provided in the working area.

With regard to this last example, it may be noted that such robots are usually battery operated and hence need to be often recharged. To make the robot fully autonomous, the search for the recharge station and the actual docking need to be automated too. This task involves some navigation skills allowing the robot to find the charging station and get to its vicinity. However, charging systems that require an electric contact between the robot and the charging station, generally require accurate positioning. This is often achieved by some mechanical setups that guide the robot to the correct position and orientation, but even such setups require navigation accuracy of a few centimeters.

Some known approaches for determining a robot's position and/or orientation involve triangulation, trilateration and the like using infra-red or ultrasound beacons. In other approaches, a receiver for a satellite navigation system (such as a GPS receiver) might be used. In still other approaches, an inertial measurement unit (IMU) might be used.

SUMMARY

In the following disclosure, there is described a domestic robotic system including a robot, the robot comprising: a movement system for moving the robot over a surface; an image obtaining device for obtaining images of the exterior environment of the robot; and at least one processor in electronic communication with the movement system and the image obtaining device, the processor(s) programmed to: detect a predetermined pattern within at least one of the obtained images, the predetermined pattern being associated with a marker provided on a base station; respond to the detection of the predetermined pattern by determining, by a first process, an estimate of the robot's position and/or orientation, said estimate of the robot's position and orientation being relative to the base station, the processor(s) and image obtaining device thereby forming at least part of a first navigation system for the robot; determine, by a second process, an alternative estimate of the robot's position and/or orientation, the processor(s) thereby forming part of a second navigation system for the robot; and perform at least one calibration of said second navigation system using said first navigation system.

In the following disclosure, there is additionally described a domestic robotic system including a robot, the robot comprising: a movement system for moving the robot over a surface; an image obtaining device for obtaining images of the exterior environment of the robot; and at least one processor in electronic communication with the movement system and the image obtaining device, the processor(s) programmed to operate in a "trail recording mode" so as to: detect a predetermined pattern within at least one of the obtained images, the predetermined pattern being associated with a marker carried by a user; and respond to the detection of the predetermined pattern by determining an estimate of the robot's position and orientation relative to the marker; and using said estimate of the robot's position and orientation relative to the marker, store information defining the path taken by the marker.

In the following disclosure, there is additionally described a domestic robotic system including a robot, the robot comprising: a movement system for moving the robot along a surface; an image obtaining device for obtaining images of the exterior environment of the robot, the image obtaining device being configured to distinguish between light of different polarizations; and, at least one processor in electronic communication with the movement system and the image obtaining device, the processor(s) programmed to: detect a predetermined pattern within at least one of the obtained images, the predetermined pattern being associated with at least one marker object; and, respond to the detection of the predetermined pattern by determining a robot position with respect to the at least one marker object; wherein said marker emits polarized light with a polarization pattern corresponding to said predetermined pattern.

Still further, the following disclosure describes a robot system, comprising a robot.

The robot comprises: a movement system for moving the robot along a surface; an image obtaining device for obtaining images of the exterior environment of the robot; and, a processor in electronic communication with the movement system and the image obtaining device. The processor is programmed to: detect a predetermined pattern within at least one of the obtained images, the predetermined pattern being associated with at least one marker object; and, respond to the detection of the predetermined pattern by determining a robot position with respect to the at least one marker object.

Optionally, such robot systems may additionally comprise: at least one marker object including the predetermined pattern.

Optionally, the at least one marker including the predetermined pattern includes a plurality of marker objects each with the predetermined pattern.

Optionally, the predetermined pattern is substantially a checkerboard pattern including two diagonally opposing first rectangles of a first tone and two diagonally opposing second rectangles of a second, contrasting tone.

Optionally, the at least one of the obtained images each includes a plurality of pixels and detecting said predetermined pattern includes analyzing, for each of a number of said pixels, the intensity of the image in a number of areas adjacent that pixel; specifically, the average intensity of the image in those areas may be analyzed. Suitably, four such areas may be used, which are arranged substantially in a square matrix centered on that pixel.

Optionally, determining a robot position with respect to the at least one marker object includes detecting and analyzing the positions within said at least one of the obtained images corresponding to at least some of the corners of said predetermined pattern.

Optionally, determining a robot position with respect to the at least one marker object includes analyzing the geometrical warping of the representation of the predetermined pattern within said at least one of the obtained images.

In the following disclosure, there is additionally described methods for accurately navigating a robot into a base station, such as a charging station or docking station, for battery charging, maintenance or status checks, protection from harsh weather, and the like. The robot navigates to a base station by detecting a unique marker attached or positioned relative to the base, and determining the position and orientation of the robot with respect to the marker.

Constructions taught in the following disclosure may include a front looking camera positioned on the robot. The camera images may be processed by an image processor, which detects the unique marker pattern within the field of view and then calculates the relative position and orientation of the robot with respect to the marker, by comparing the size and geometrical warping of the detected and processed pattern relative to an original preprogrammed pattern.

In the following disclosure, there are additionally described methods and systems for a robot, such as an autonomous robot, to return to a base station, such as a charging station or the like. The robot returns to the base station by, for example, detecting a predetermined pattern associated with the location of the base station from an image, responding to the predetermined pattern being detected by determining a robot position with respect to the location of the base station, and, calculating a path to the location of the base station from the determined position.

In the following disclosure, there is additionally described a method for returning a robot to a base station, such as a charging station, charger, enclosure, maintenance port, or the like, The method comprises: detecting a predetermined pattern associated with the location of the base station from an image; responding to the predetermined pattern being detected by determining a robot position with respect to the location of the base station; and, calculating a path to the location of the base station from the determined position.

Optionally, the method additionally comprises, moving the robot toward the location of the base station; and, continuously correcting the path to the location of the base station based on continuously determining the robot position with respect to the location of the base station.

Optionally, detecting the predetermined pattern includes comparing the pattern from the image with a predetermined pattern for a match.

Optionally, the responding to the pattern being detected includes determining that there is a match between the pattern of the image and the predetermined pattern associated with the location of the base station.

Optionally, the predetermined pattern is displayed on a display screen.

Optionally, the display screen is at the base station.

Optionally, the predetermined pattern is attached to the base station.

Optionally, the predetermined pattern includes corners and the calculation of the match is performed by applying a corner detection algorithm.

Optionally, the corner detection algorithm includes a Harris & Stephens corner detection algorithm.

Optionally, the predetermined pattern is polarized and the detecting the polarized predetermined pattern is performed with an imaging system for processing polarized patterns.

In the following disclosure, there is additionally described a robot system. The system comprises a robot, such as an autonomous robot, comprising: a movement system for moving the robot along a surface; an image obtaining device for obtaining images associated with a destination for the robot; and, a processor in electronic communication with the movement system and the image obtaining device. The processor is programmed to: detect a predetermined pattern associated with the destination for the robot from at least one of the obtained images; respond to the detected predetermined pattern being the pattern associated with the destination by determining a robot position with respect to the location of the destination; and, calculate a path to the destination from the determined position.

Optionally, the processor is additionally programmed to: cause the movement system to move the robot toward the destination; and, continuously correct the path to the destination based on continuously determining the robot position with respect to the destination.

Optionally, the processor is additionally programmed to: compare the patterns of the obtained images associated with the destination to the predetermined pattern associated with the destination, for matches.

Optionally, the processor is additionally programmed to: respond to the predetermined pattern including determining that there is a match between the patterns of the obtained images associated with the destination to the predetermined pattern associated with the destination.

Optionally, the robot system additionally comprises a base station at the destination, the base station including the predetermined pattern.

Optionally, the predetermined pattern is displayed on a display screen associated with the base station.

Optionally, the display screen is at the base station.

Optionally, the processor is additionally programmed to apply a corner detection algorithm to the detected pattern to determine the match with the predetermined pattern.

Optionally, the corner detection algorithm includes a Harris & Stephens corner detection algorithm.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like elements. In the drawings.

DETAILED DESCRIPTION OF THE DRAWINGS

Figure 1:
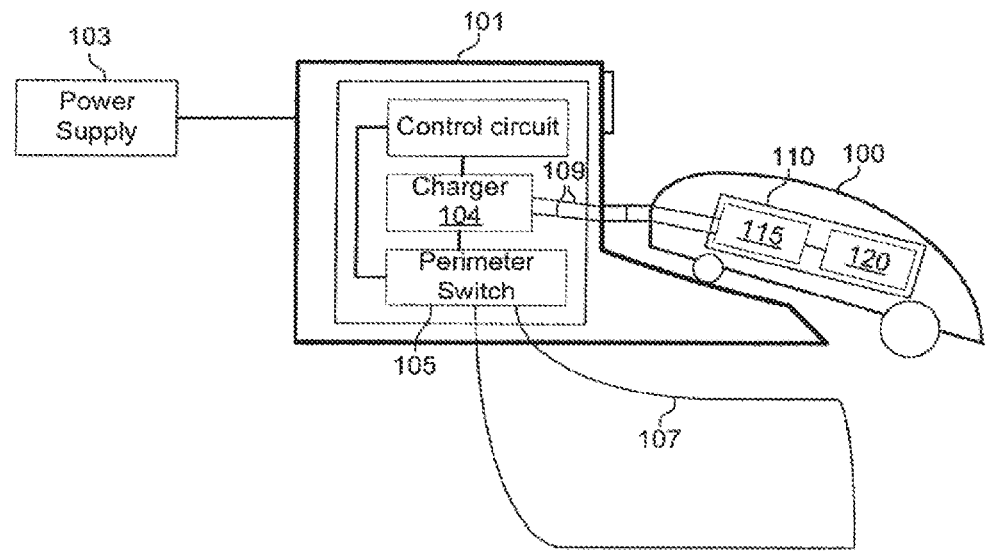
FIG. 1 is a diagram of an exemplary domestic robotic system in accordance with embodiments of the present invention.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is an exemplary diagram showing an autonomous machine, for example, an autonomous robot 100, or robot, and an associated base station, for example a charging or docking station 101, or the like. Throughout this document, "base station", "charging station" and "docking station" are used interchangeably.

In accordance with the system shown in FIG. 1, robot 100 and charging station 101 communicate through a transmission part 109a, including power lines 109 of the charging station 101, through which electrically conductive docking contacts 102 of the robot 101 receive power, e.g., electricity, to charge the robot 101. Power is supplied from charger 104 in charging station 101, through power lines 109, to the robot 100, via docking contacts 102, which are also magnetic, to maintain engagement of the robot 100 and the transmission part 109a of the charging station 101, during charging.

As shown in FIG. 1, a robot 100 operates with a base station, which is, for example, charging station 101, in an exemplary environment for the present invention. The base station may also be any kind of docking station, such as to for maintenance, taking various readings, and protecting the robot from harsh weather and the like.

The charging station 101 includes a physical base, a transmission part 102 formed, for example, of charging pins (or receptors) 102a, or arms 102b (FIG. 2C), a power supply 103, and an electronic board, that includes, for example, a charging circuit section 104 and a perimeter switch 105, both controlled by one or more processors and associated hardware and/or firmware, such as microprocessor control circuit 106.

Charging circuit section 104 drives the perimeter switch 105, which applies and controls the current in one or more perimeter loops 107 which defines the work area 107a or operational zone for the robot 100. In addition, a marker 108 (with a pattern), is associated with the charging station 101. The marker 108 may, for example, be provided on a surface of the charging station 10, or could be provided on a monitor or other visual indicator for providing visual images (including polarized images, as shown, for example, in FIG. 4B). The marker 108 may also be attached to or close to the charging station 101. For example a marker 108' with a pattern is attached to the charging station 101 (for example, forming a marker object), as shown in FIG. 2C.

The robot 100 connects to the charging station 101, in particular, at the transmission part 102, via docking contacts 202. These docking contacts 202 are electrically conductive, for electricity to reach the robot power supply 226 for recharging. The docking contacts 202 are also magnetic, to maintain engagement of the robot 100 and the transmission part 102 of the charging station 101, during charging, taking measurements, and the like. The robot 100 includes a control system 120, which, is processor based, and includes electronics and computer components, and the like, for operating the robot 100. More particularly, the control system 120 may include one or more processors as a central processing unit (CPU) 302 and storage/memory 304 associated with the CPU 302. The control system 120 and a charging circuit 115 for the robot may be provided within an internal housing 110 of the robot.

The robot 100 is, for example, a robotic lawnmower. Hence (or otherwise), the robot's working environment may be a garden. This robotic lawnmower may be for example, the robotic lawnmower disclosed in commonly owned U.S. patent application Ser. No. 12/788,489 (published as US Patent Application Publication No. US 2011/0130875 A1) and Ser. No. 13/918,924 (published as US Patent Application Publication No. US 2013/0274920 A1), PCT Patent Application No. WO 2001/70009, and Patent Cooperation Treaty Publications WO 01/70009 (PCT/IL01/00253), and WO 2005/074362, all three of these documents incorporated by reference in their entirety herein. The robot 100 may also be Robotic Lawnmower Model Numbers RL 500, RL 550, RL 800 and RL 850, from Friendly Robotics (the trading name of the owner of this application) of Pardesiya, Israel. All of the above-listed exemplary robots are useful as the robot 100, and are modified to be in accordance with the robot 100 as disclosed herein, and are adapted for use with the charging station 101.

Figure 2A:
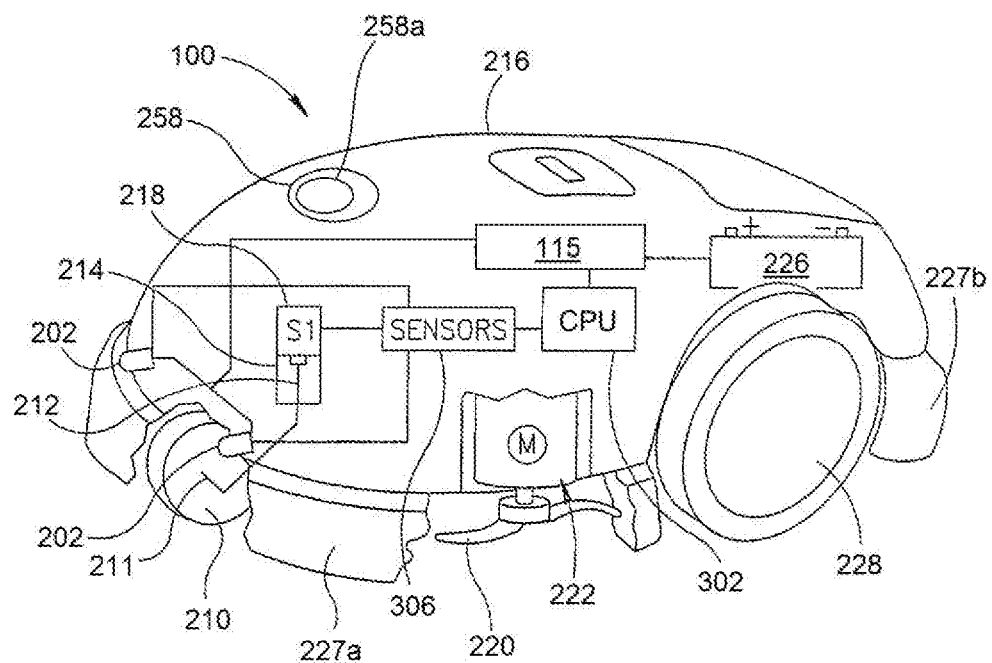
FIG. 2A is a perspective view of a robot used with the system of FIG. 1.
Figure 2B:
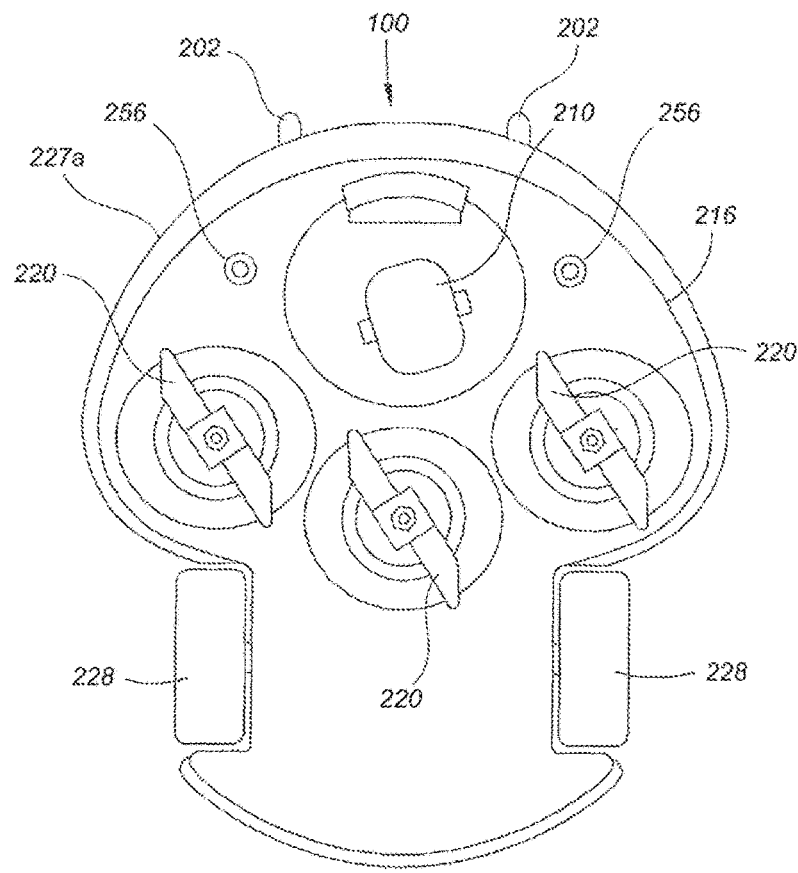
FIG. 2B is a bottom view of the robot of FIG. 2A.
Figure 2C:
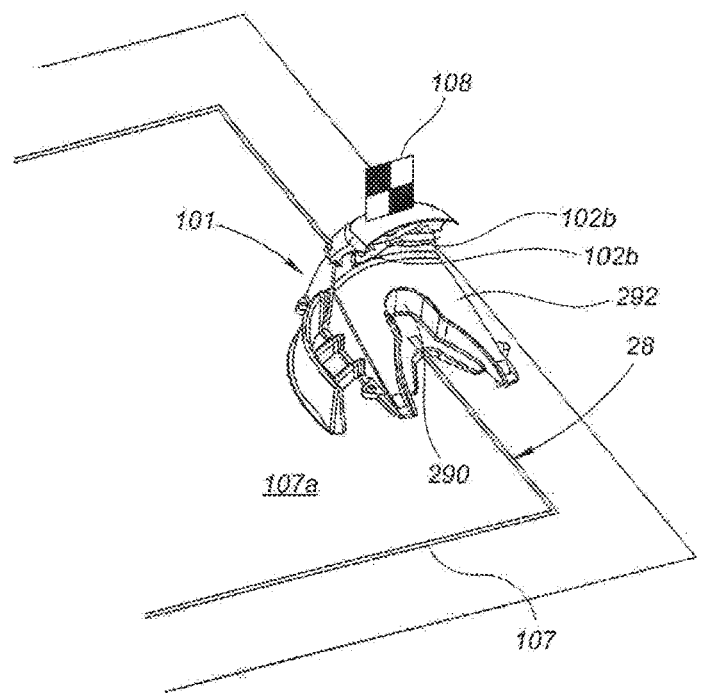
FIG. 2C is an alternative docking station used with the system of FIG. 1.

As shown in FIGS. 2A and 2B, the robot 100 includes docking contacts 202 (transmission parts for the transmission of energy, electricity, signals, or the like), extending forward or laterally from the front side 206 of the robot 100. The docking contacts 202 are typically parallel to the horizontal or ground surface. The docking contacts 202 are electronically linked (in electronic communication) to adjacency sensors 306 (FIG. 3), and to the charging circuit 115, and a power supply 226, for example, a battery. The charging via the charging circuit 115 is controlled by the control system 120.

The robot 100 includes a front wheel 210, which is, for example, passive, and rear or drive wheels 228, on opposite sides of the robot 100. Both the front wheel 210 and rear drive wheels 228 are controlled by the control system 120. The front wheel 210 has an axle 211, which extends into a vertical rod section 212. This vertical rod section 212 is slideably mounted in a vertical orientation in a well 214 in the body 216 of the robot 100. Within the well 214 is a sensor (SE1) 218. This sensor 218 detects wheel 210 positions by detecting the position of the vertical rod section 212. The sensor (SE1) 218 may be an electrical contact sensor, ultrasonic or light sensor, or any other position detecting sensor.

The front wheel 210 of the robot 100 is slideably mounted in a vertical orientation, such that when the axle 211/rod section 212, on which the front wheel 210 is mounted, slides or drops downward to a predetermined level (also caused by lifting the body of the robot 100 at its front end), the rod section 212 is out of contact with the sensor (SE1) 218, linked to the control unit 220 via the adjacency sensors 306. As a result, the requisite components of the control system 120 signal the drive system 228a to stop movement of the drive wheels 228 of the robot 100. This occurs when the charging station 101 of FIG. 2C includes a valley 290 surrounded by an inclined section 292, to accommodate a front wheel 210 drop down event, causing the drive system 228a to stop movement of the drive wheels 228 in response to the wheel 210 drop down event.

In charging stations, such as charging station 101, which lack openings or cut-outs for the aforementioned dropping down of the front wheel 210, the CPU 302 is configured to receive a signal or other indication from the docking contacts 202, that a sufficient docking contact has been made with the corresponding transmission part of the charging station. The CPU 302 then signals the drive system 228a to stop movement of the drive wheels 228 of the robot 100. Alternatively, the front wheel may be on the axle 211 which is of a fixed length and fixed to the body of the robot 100, and the sensors (SE1) 218 not present, such that the stopping of drive wheels 228 is based on the aforementioned docking signal.

The robot 100, shown here, for example, as a lawn mower, includes cutting blades 220 driven by motors (M) 222. It also includes a power supply 226, for example, a battery, charged via the charging circuit 115, and front 227a and rear 227b bumpers. These bumpers 227a, 227b, when depressed to requisite amounts, activate adjacency sensors 306, which signal the CPU 302, which in turn, signals the drive system 228a to stop the drive wheels 228. The front wheel 210 is passive (and typically has 360 degree movement), and the drive system 228a and navigation system 308 control the rear or drive wheels 228, to move and steer the robot 100. The drive system 228a and wheels 210, 228 form a movement system for the robot 100.

The robot 100 also includes a perimeter signal receiver 256, which receives the signal transmitted by the perimeter wire 107. The robot 100 also includes a forward mounted camera 258, with a lens 258a that may be, for example, flush with the surface of the robot 100. The camera 258 obtains images, such as images of the marker 108 of the charging station. The camera 258 links to the CPU 302 of the control system 120, so that the images obtained by the camera 258 may be processed. The camera 258 may also include a polarizing filter, for example, when the marker 108 is a polarized image.

Figure 3A:
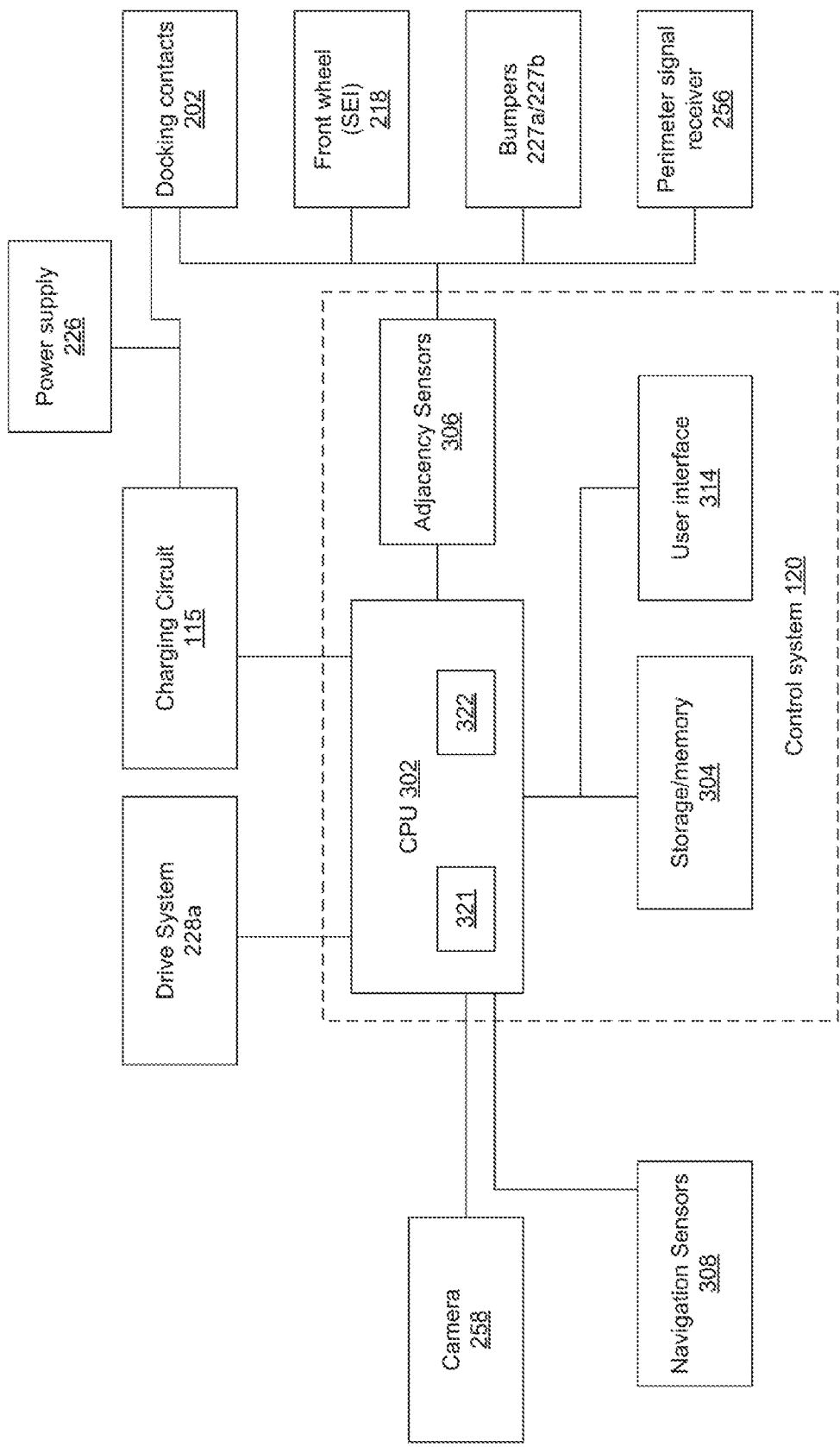
FIGS. 3A-3C depict a system architecture for the robot of FIGS. 1, 2A and 2B.

FIG. 3A is a schematic diagram of the control system 120 and various other systems and components of the robot 100 that interact with it. In the embodiment shown in FIG. 3A, the control system includes one or more processors as a central processing unit (CPU) 302, with storage/memory 304 associated with the CPU 302, adjacency sensors 306, user interface 314, each linked so as to be in electronic and data communication with the CPU 302. The charging circuit 115 is also linked, in electronic and data communication with the CPU 302.

The Central Processing Unit (CPU) 302 is formed of one or more processors, including microprocessors, for performing the robot 100 functions and operations detailed herein. The processors are, for example, conventional processors, such as those used in computers, and other computerized devices. For example, the processors may include x86 Processors from AMD and Intel, Xenon® and Pentium® processors from Intel, as well as any combinations thereof. The CPU 302, for example, directly controls the charging circuit 115, which in turn, controls the charging of the power supply 226. The CPU 302 also controls the motors (M) 222, which drive cutting blades 220.

Figure 3B:
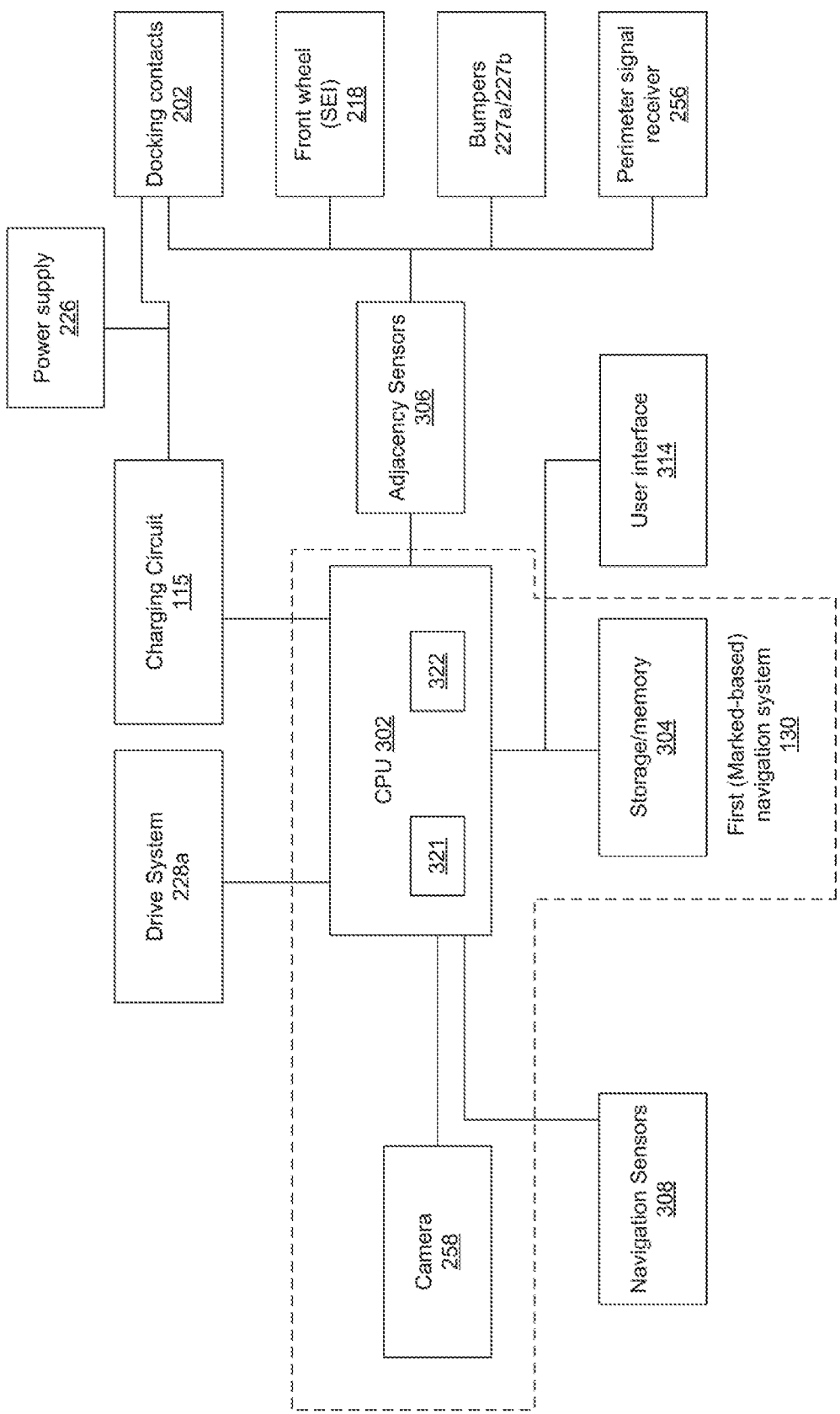
Figure 3C:
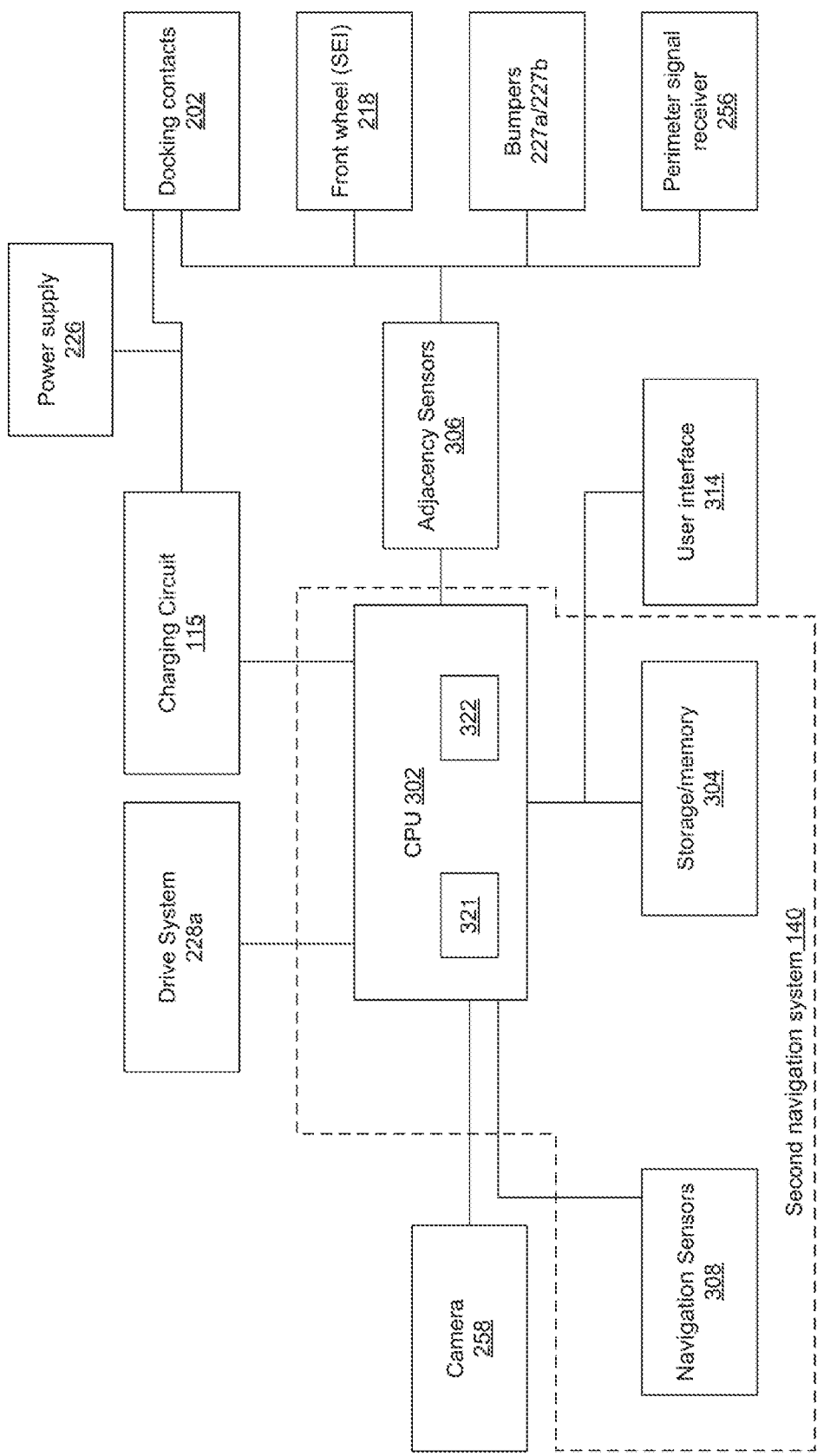

The storage/memory 304 is any conventional storage media. The storage/memory 304 stores machine executable instructions associated with the operation of the robot, which are executed by the CPU 302. More particularly, as shown in FIGS. 3A-3C, the CPU 302 may be programmed with instructions for two processes 321, 322 for determining an estimate of the robot's current position and/or orientation. Each of these processes 321, 322 corresponds to a respective navigation system 130, 140, which are shown in FIGS. 3B and 3C respectively. The storage/memory 304 may store various information to assist with the operation of these navigation systems, such as information defining the pattern of the marker 108 and, more generally, the instructions for processes 321, 322.

The storage/memory 304 may also, for example, store rules and policies for the robot 100. Additionally or otherwise, it may store various scanning and movement patterns for the robot 100, as well as perimeter maps of the work areas. The CPU 302 may therefore control the rear or drive wheels 228 in accordance with such rules, policies and information stored on the storage/memory 304. It will be appreciated that the processors of the CPU 302 and the storage/memory 304, although shown as a single component for representative purposes, may be multiple components.

The adjacency sensors 306 are a central point for receiving signals from the docking contacts 202, Front wheel sensor (SE1) 218 (if present) bumpers 227a, 227b, and perimeter signal receiver 256. These adjacency sensors 306 report the received signals/conditions to the CPU 302, which then provides a signal to the specific system(s) for the necessary action.

Attention is now directed to FIG. 3B, which illustrates the first, marker-based navigation system 130 for the robot 100. As shown in FIG. 3B, this first, marker-based navigation system may include camera 258 or other image obtaining device, CPU 302 and storage/memory 304.

In more detail, CPU 302 receives images from the camera 258 or other image obtaining device, and processes these received images. The processed images are compared to images or patterns of the marker 108 stored in the storage/memory 304. If a match is determined, the CPU 302 calculates, using a first process 321, the relative position and orientation of the robot 100, with respect to the marker 108. This process may, for example compare the size and geometrical warping of the detected marker pattern to the original pattern stored on storage/memory 304. An example of such a process is described in further detail below with reference to FIGS. 6-8. The marker may be provided at the docking station 101, as shown in FIG. 1; accordingly, the CPU 302 may determine the relative position and orientation of the robot 100, with respect to the docking station 101.

As may be seen from FIGS. 3A-3C, the robot further includes a number of navigation sensors 308. In the specific example shown in FIG. 3C, the navigation sensors 308 form part of a second navigation system 140; as is also shown in FIG. 3C, this second navigation system may include navigation sensors 308, CPU 302 and storage/memory 304. The CPU 302 receives signals from the navigation sensors 308 and, using the second process 322, is able to determine an estimate of the robot's current position and/or orientation that is an alternative to the estimate provided by the first (marker-based) navigation system 130. The navigation sensors 308 of the second navigation system 140 may be of various types. For instance, sensors operable to sense the relative motion of the robot might be used, such as odometers, accelerometers, gyroscopes, magnetometers and the like. The output of such relative motion sensors may, for example, be integrated so as to determine the robot's current position and/or orientation. Such sensors may, in embodiments, be provided by an inertial measurement unit (IMU). In another example, sensors operable to receive signals exterior the robot might be used. Specifically, such sensors might receive signals from beacons, satellites, and the like. In embodiments, therefore, such sensors might be provided by a satellite navigation system receiver and/or a local positioning system receiver.

While the example shown in FIGS. 3A-3C the second navigation system 140 includes navigation sensors 308, it is envisaged that the camera 258 may be used by the second navigation system 140 instead of, or in addition to, navigation sensors 308. For instance, the second process 322 might analyse the optical flow in the images received from the camera 258 so as to determine the relative motion of the robot 100 with respect to its environment. In this way, the CPU 302, using the second process, may determine the relative position and orientation of the robot 100.

It is further envisaged that the robot 100 may include additional (third, fourth, fifth etc.) navigation systems. Each such navigation system may include a distinct collection of navigation sensors. For example, if the second navigation system included navigation sensors that were operable to sense the relative motion of the robot, the third navigation system might include sensors operable to receive signals exterior the robot, such as from beacons, satellites, and the like. Alternatively, certain navigation sensors might be shared between two or more of the navigation systems. Still further, the additional (third, fourth, fifth etc.) navigation systems might include camera 258 instead of, or in addition to, navigation sensors.

There is also a user interface 314, that can access a network, such as the Internet, or be accessed directly by a control device that may plug directly into the robot 100 or communicate wirelessly with the robot 100, or a control pad on the robot 100. As an option, the various marker images and patterns could be programmed into the control system 120, and stored in storage/memory 304 through this user interface 314.

The robot 100, via the control system 120 can also be programmed with machine executable instructions, for execution by the CPU 302, for example. The control system 120 may be programmed, by either being preprogrammed and/or via the user interface 314.

Figure 4A:
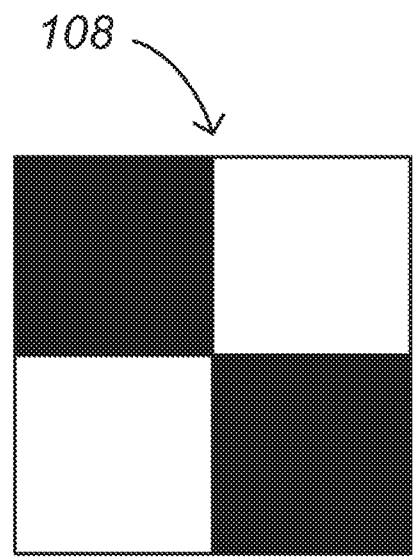
FIGS. 4A-4B illustrate markers suitable for use with the docking stations of FIG. 1 and FIG. 2C.

The marker 108 for use with the first navigation system 130 may have a high contrast pattern, so that it can be well-differentiated from the background. FIG. 4A shows an example of a suitable marker 108. As may be seen, the marker 108 has a 2×2 checkerboard pattern, which includes two diagonally opposing first rectangles of a first tone (e.g. black) and two diagonally opposing second rectangles of a second, contrasting tone (e.g. white); the first and second tones may, more specifically, be substantially opposite.

Such markers including a high contrast pattern may not only be visible to the robot, but also to the user. However, such a dominant graphical pattern may not always fit a consumer product environment. Therefore, it may be beneficial to hide this pattern or make it less dominant to the human eye. Accordingly, it is envisaged that the marker may emit polarized light with a polarization pattern corresponding to a predetermined pattern.

Figure 4B:
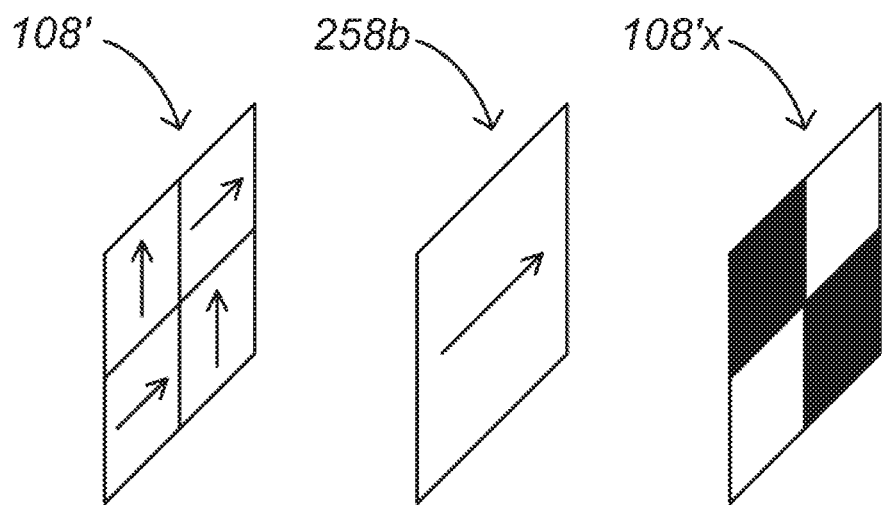

An example is shown in FIG. 4B, where the marker 108' emits light with a 2×2 checkerboard polarization pattern. More specifically, the marker 108' includes two diagonally opposing first rectangles, which emit light having a first polarization and two diagonally opposing second rectangles, which emit light having a second, substantially opposite polarization (the arrows in the in FIG. 4B indicate the directions of polarization). In the specific example illustrated, the first rectangles emit light that is horizontally polarized, while the second rectangles emit light that is vertically polarized. Such a marker may be produced by applying four rectangles of polarizer film, with the polarization directions aligned appropriately, to a reflective background layer (for example a white diffusive paper).

When this marker 108' is viewed through a horizontal polarizing filter 258b, a similar pattern 108'x to that of the marker 108 of FIG. 4A is visible; in other words, the marker 108' appears as a black and white checkerboard 108'x (or, perhaps more accurately, a black and grey checkerboard, since typically around 50% of the light will be lost as a result of the action of the polarizing filter). To the human eye, however, the marker 108' simply looks like a big square and the checkerboard pattern will typically not be visible. As a result, the background layer may carry a decorative design, such as some graphics (e.g. a company logo etc).

The polarizing filter 258b may be applied to the front of or behind the lens 258a of the camera 258 of the robot 100; the robot 100 may then process the detected image in substantially the same way as with a marker using a visible pattern.

Alternative embodiments may use polarizers that are linear (with perpendicular polarizations) or circular. In the case of circular polarizers, both clockwise and counter-clockwise polarizations may be used. For instance, with circular polarizers, the two first rectangles of the marker 108' of FIG. 4B may be set to clockwise polarization and the two second rectangles to counter-clockwise polarization. Markers such as those described above with reference to FIGS. 4A and 4B may provide the first navigation system 130 (camera 258, CPU 302, and storage/memory 304) of the robot 100 with a high probability of detection with low false-positive rates. However, it should be appreciated that a range of alternative marker patterns might be used, depending on the particular application.

Once the pattern has been identified in the images received from the camera 258, the CPU 302 can extract the relative position of the robot 100 in three dimensions (3D).

Figure 5:
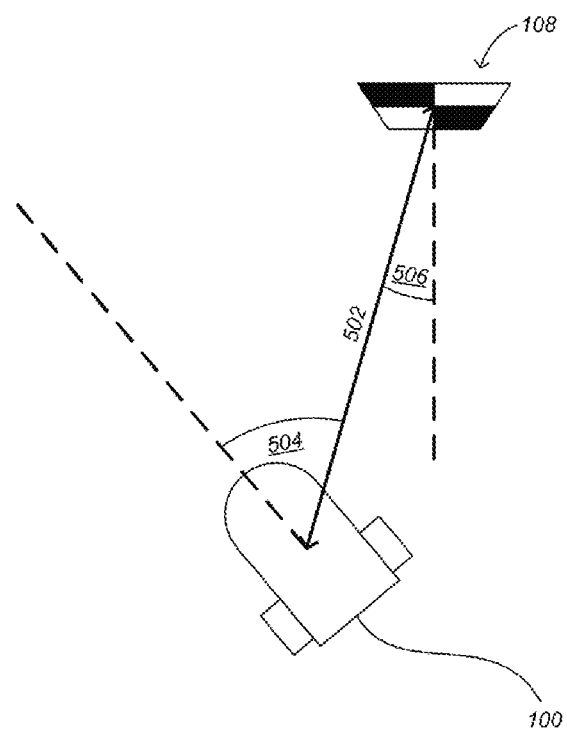
FIG. 5 is a diagram of the robot navigating with the aid of a marker associated with the docking station of FIG. 1.

However, the robot 100 and image processing system typically obtain the relative location of the robot 100 in two dimensions (2D), for example, these dimensions being the distance 502, heading angle 504 and approach angle 506, with respect to the marker 108, as shown in FIG. 5.

Attention is now directed to FIGS. 6A-6D, which show a flow diagram detailing a computer-implemented process by which a first, marker-based navigation system 130 may be used to calibrate another navigation system, for example a second navigation system 140 as described above. In the accompanying description, reference is also made to elements shown in FIGS. 1-5; however, it should be appreciated that this is for the purpose of explanation only and that, in particular, the second navigation system 140 need not have the specific configuration shown in FIGS. 3A-3C. More particularly, as discussed above, the camera 258 may be used by the second navigation system 140 instead of, or in addition to, navigation sensors 308.

The process and subprocesses of FIGS. 6A-6D are computerized processes performed by the control system 120, and the various systems and components of the robot 100. The aforementioned processes and sub-processes are, for example, performed automatically and in real time. Reference is also made to the FIGS. 7A-7C and 8, to illustrate the various aspects of the processes and subprocesses of FIGS. 6A-6D.

Figure 6A:
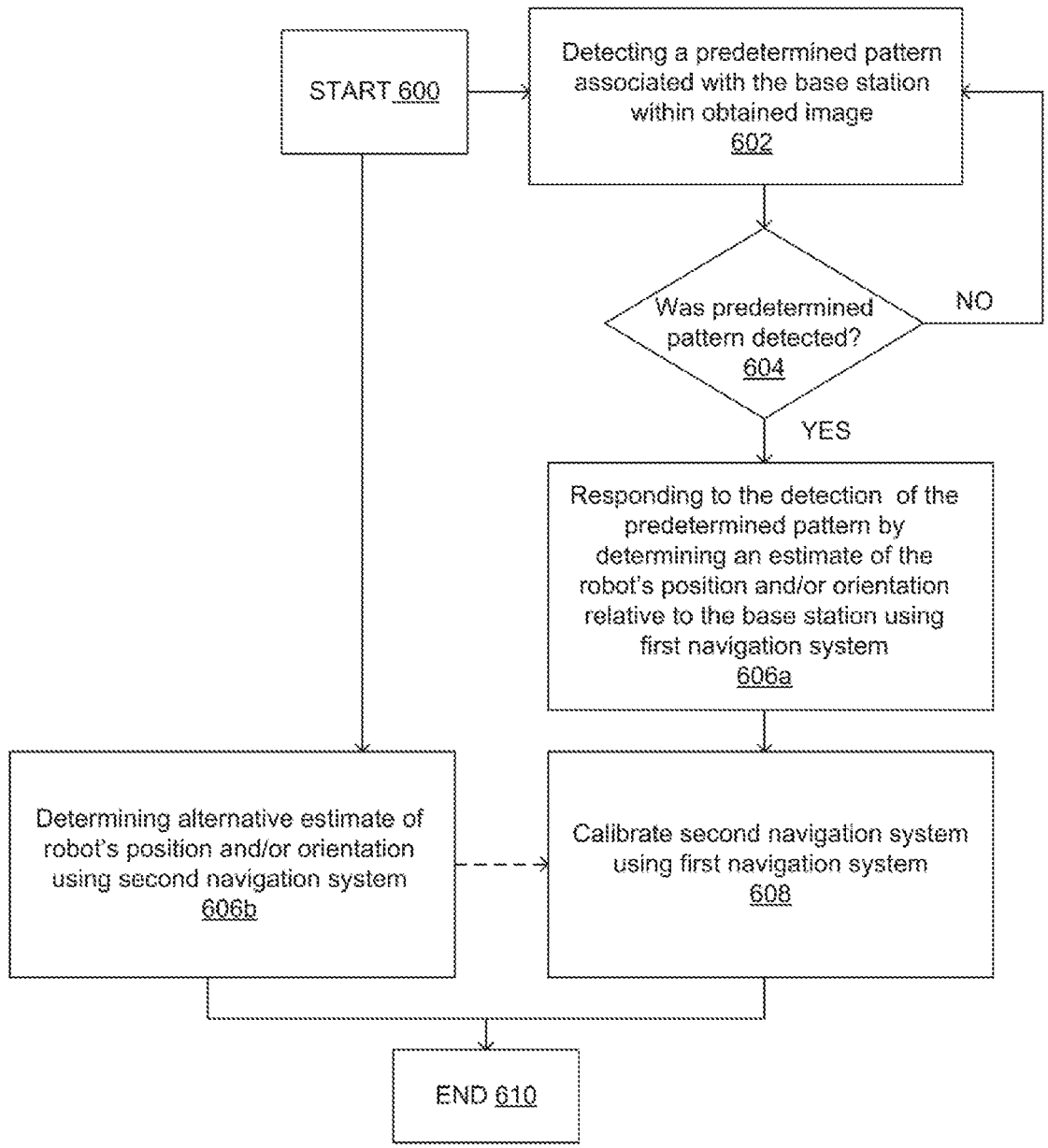
FIGS. 6A-6D are flow diagrams of processes performed by the robot in accordance with embodiments of the invention.
Figure 6B:
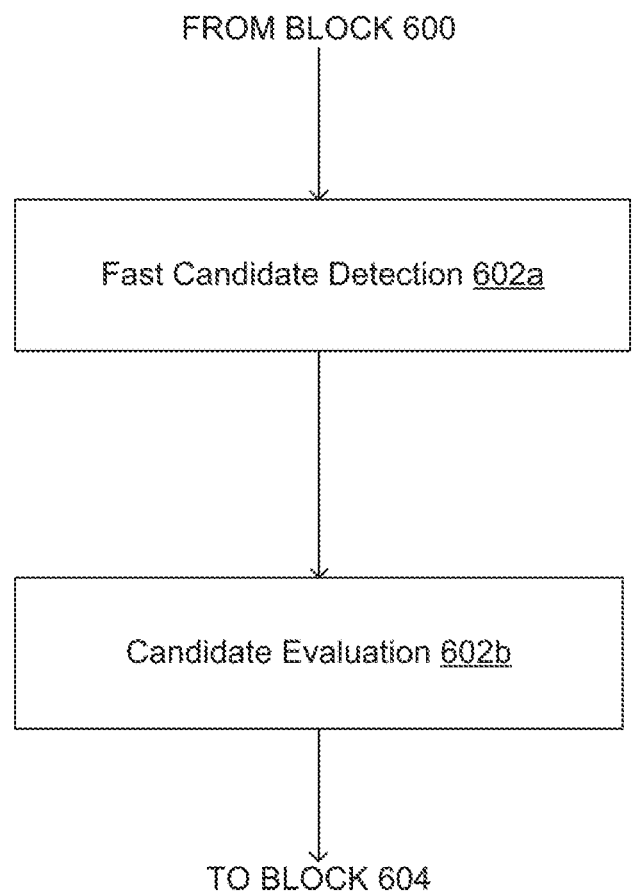
Figure 6C:
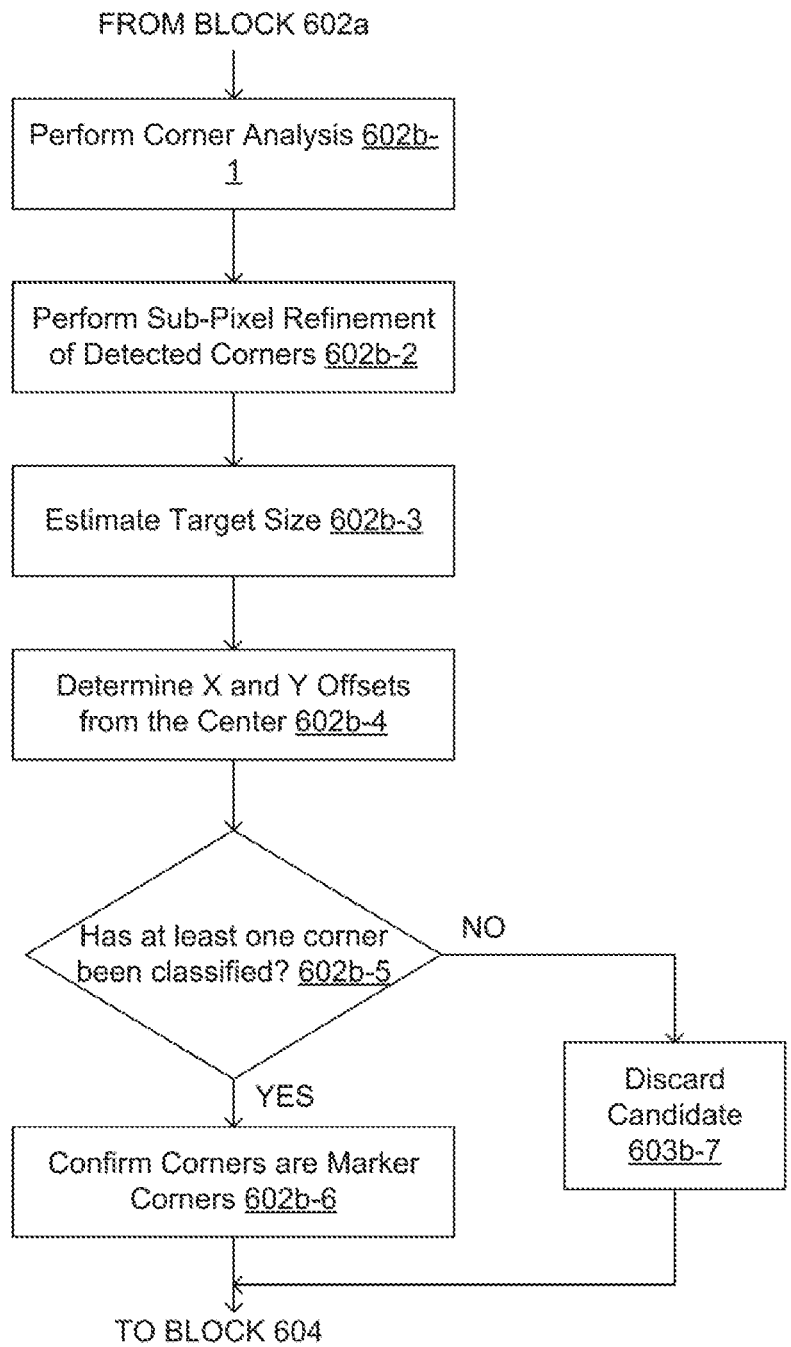
Figure 6D:
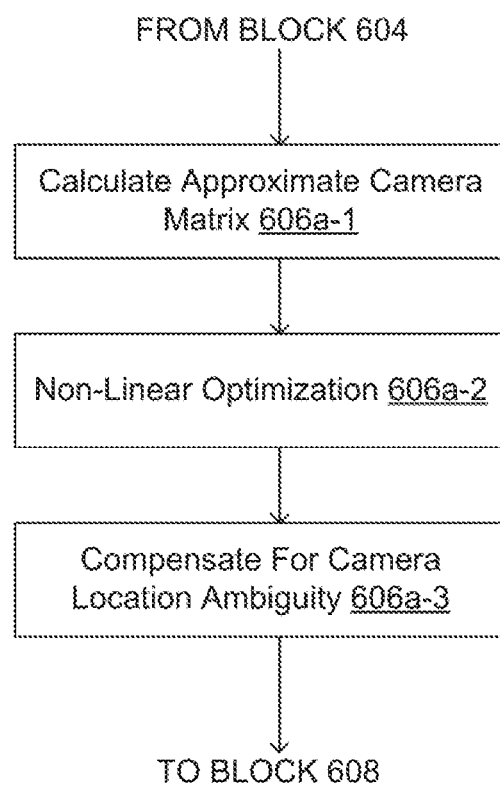
Figure 7A:
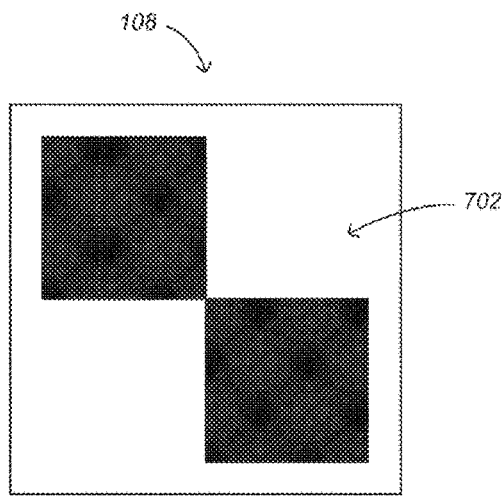
FIGS. 7A-7C are diagrams of the marker and target used with the docking station and analyzed by a first, marker-based navigation system of the robot, in accordance with embodiments of the present invention.

FIG. 6A illustrates the overall process that the CPU 302 of the robot 100 performs to calibrate a second navigation system 140 using a first, marker-based navigation system 130. FIGS. 6B and 6C illustrate processes involved in the process of block 602, and FIG. 6D illustrates processes involved in the process of block 606a.

The process begins at the START block 600. At this time, the robot and base station 101 may have recently been installed by the user, the robot 100 may have been operating for greater than a predetermined number of hours, or may require calibration of its second navigation system 140 for some other reason.

With the robot 100 needing to calibrate its second navigation system 140, the process moves, in parallel, to blocks 602 and 606b. At block 602, the CPU 302 processes the images being received from the camera 258 to determine whether a predetermined pattern associated with the marker 108 provided on base station 101 is present within the obtained image(s).

At block 604, if a match was not determined, the process returns to block 602. Should a match have been determined, the process moves to block 606a.

With the predetermined pattern having been detected, the process moves to block 606a, where the CPU 302 responds to the detection by determining, using first process 321, an estimate of the robot's position and orientation relative to the base station 101. The marker 108 may be provided in a specific location and at a specific orientation on the base station 101. Accordingly, information relating to this specific location and/or orientation of the marker 108 on the base station 101 may be used in first process 321 to determine the estimate of the robot's position and orientation relative to the base station 101. This information may be stored in storage/memory 304.

Having determined an estimate of the robot's position and orientation relative to the base station 101, the process moves to block 608, where the CPU 302 performs a calibration of the second navigation system 140 using the first navigation system 130.

At block 606b, the CPU 302, using a second process 322, determines an estimate of the robot's current position and/or orientation that is an alternative to the estimate provided by the first (marker-based) navigation system 130. In some cases, block 606b may run continuously; the CPU 302 may continuously determine an estimate of the robot's current position and/or orientation using the second process 322. For example, the alternative estimate of the robot's current position and/or orientation may be continuously updated. For example, where the second navigation system 140 determines the alternative estimate by sensing relative motion of the robot, the second process 322 may involve continuously summing or integrating changes in the position and/or orientation of the robot 100. As a result, the second navigation system 140 may in effect continuously update its estimate of the robot's position and/or orientation.

In addition or instead, block 606b may run prior to block 608; the process may wait until the alternative estimate of the of the robot's position and/or orientation has been determined using the second process 322. In such embodiments, the calibration may, for example, include comparing the alternative estimate with the estimate provided by the first navigation system 130.

Measurement Error Calibrations

In a specific series of embodiments, the calibration may account for measurement errors that are expected to result from typical operation of the robot within the working environment (e.g. the garden, in the case of a robotic lawnmower). Such measurement errors are generally, therefore, not specific to a particular location within the working environment, nor are they generally specific to a particular point in time (though they may account for time-varying errors, such as sensor drift).

In such embodiments, the measurement error calibration carried out by the CPU 302 may include determining values for a series of adjustment parameters. These adjustment parameters account for such measurement errors that are expected during typical operation of the robot. For example, such adjustment parameters may account for measurement errors that are expected to occur over substantially all of the working environment (e.g. over substantially the whole of the garden, in the case of a robotic lawnmower). For instance, respective adjustment parameters could account for sensor drift by an odometer, accelerometer, gyro etc. that form part of the second navigation system 140.

To give a specific example, in the case of a magnetometer, a series of adjustment parameters might be calculated, each of which corresponds to the calculated absolute error of the magnetometer in a particular angular range with respect to Magnetic North. For example, if the magnetometer reading is in the range 0°-45° (with respect to Magnetic North), the corresponding adjustment parameter for that angular band may indicate a correction of −4°; if the if the magnetometer reading is in the range 46°-90° (with respect to Magnetic North), the corresponding adjustment parameter for that angular band may indicate a correction of +5°. Such adjustment parameter values may be determined by comparing, at various angles, the estimate of the robot's orientation provided by the first (marker-based) navigation system 130, with the estimate of the robot's orientation provided by the second navigation system 140, which utilises the magnetometer.

In a further specific example, with an odometer one adjustment parameter may be employed that (linearly) scales the output of the odometer. Such an adjustment parameter may, for instance, account for: wear of the wheel whose rotations the odometer senses; manufacturing variability in the diameter of the wheel; and/or loosening of the wheel mounting. Such factors may result in each rotation of the wheel corresponding to a distance that is different from a nominal value, thus causing an error in distance measurements using the odometer. Such an adjustment parameter value may be determined by moving the robot along a path and comparing the distance travelled, as calculated using the first (marker-based) navigation system 130 to the second navigation system 140, which utilises the odometer. For instance, the value of the adjustment parameter may be chosen such that the second navigation system 140, which utilises the odometer, then gives the same result for distance travelled as the first (marker-based) navigation system 130.

More generally, in some cases, the CPU 302 may determine values for the adjustment parameters including by calculating the difference between the estimate, from the first (marker-based) navigation system 130, of the robot's position and orientation, at one or more points within the working environment, with the corresponding estimates, from the second navigation system 140, of the robot's position and orientation, at the same one or more points within the working environment. These difference values are then used by the CPU 302 to calculate the one or more adjustment values.

Alternatively (or perhaps in addition), the CPU 302 may determine values for the adjustment parameters including by calculating the difference between the change, as determined by the first (marker-based) navigation system 130, in the robot's position and orientation between two points within the working environment, with the change, as determined by the second navigation system 140, in the robot's position and orientation between the same two points within the working environment. These difference values are then used by the CPU 302 to calculate the one or more adjustment values.

To determine a suitable value for the adjustment parameters corresponding to each sensor type, the robot may carry out a respective movement pattern, for instance travelling along a path of known length (e.g. in the case of an odometer or accelerometer), or turning on the spot through a predetermined angle (e.g. in the case of a gyro), or to various predetermined angular positions (e.g. in the case of a magnetometer). Examples of suitable movement patterns for calibrating various sensor types are discussed in further detail below in the "movement pattern calibration" section.

With the calibration of the second navigation system 140 having been carried out, the process ends at block 614.

The calibration of the second navigation system may be carried out when the robot is docked at, or in the vicinity of the base station. This may be a relatively "safe" way of calibrating the second navigation system 140 as the robot 100 is likely to be able to detect marker 100 and therefore should be able to navigate (using the first navigation system 130) with relative accuracy, even though the second navigation system 140 has not yet been calibrated. Thus, the risk of the robot getting "lost" during the calibration may be reduced. Indeed, where the calibration is carried out while the robot is docked at the base station, the risk of the robot 100 getting "lost" is very small.

Turning back to block 602, and FIG. 6B, there is detailed a process for detecting a predetermined pattern associated with a marker 108 provided on the base station 101, at block 602.

Initially, the process begins at block 602a, with a process known as fast candidate detection.

Fast Candidate Detection

Figure 7B:
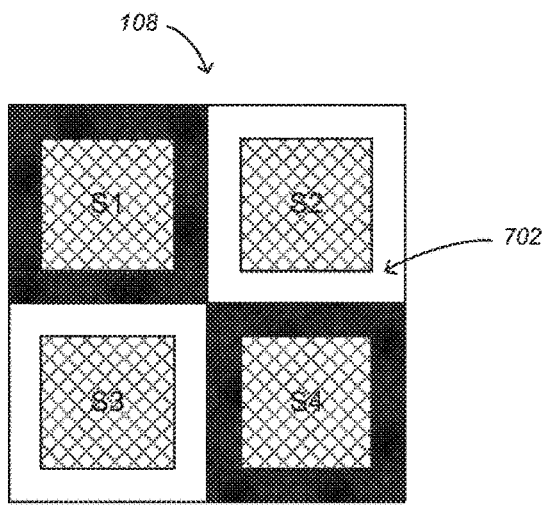

The image of the marker 108 is scanned by the camera 258 and processed by the CPU 302. The CPU 302 accesses a target location database stored on storage/memory 304, and returns a list of possible locations for the target in the image, the target 702, shown in FIG. 7A. For example, in this case, the rotation of the camera 258 relative to the target, e.g., marker 108, of the docking station 101, is fairly small (since both the robot 100 and target are on relatively flat ground). A "target score" for each pixel, of the image of the marker 108 taken by the camera 258, is calculated by using the average intensity of four squares S1-S4 around the target 702, as shown in FIG. 7B. This process yields a maximum score when the averaging squares S1-S4 align with the target 108/702, also as shown in FIG. 7B.

In performing the fast candidate detection process, the size of the averaging squares S1-S4 is a bit smaller than the expected size of the pattern squares 51, S4 (FIG. 7B), in order to compensate for small rotations and perspective effects. The size of the averaging squares S1-S4 is determined by the expected size of the pattern squares 51, S4, at the maximal desired detection distance.

Specifically, the CPU 302 performs the steps of:

1. Converting the color image into two intensity images:

$I_{min}=\min(R,G,B)$ $I_{max}=\max(R,G,B)$ where R=Red, G=Green and B=Blue, the three colors for visible light 2. For each pixel, calculate four averages of the four averaging squares S1-S4 around it:

$avg1=average(I_{max}(S1))$ $avg2=average(I_{min}(S2))$ $avg3=average(I_{min}(S3))$ $avg4=average(I_{max}(S4))$ 3. For each pixel, calculate its score, as follows:

pixel_score=min(avg2,avg3)−max(avg1,avg4)

4. Any pixel with a score above a predefined threshold, and whose score is the highest in a small area around it, is considered a candidate and added to the candidates list, in the database stored on storage/memory 304. The candidates list corresponds to possible locations of the target center in the image.

The logic for using the minimum (min) and maximum (max) operators is based on the target 108/702 being black and white. A gray pixel (black and white included) as defined as R=G=B. Therefore, with the white balance is operative in the camera 258, the target pixels have values of R=G=B. Accordingly, using $I_{min}$ for the white squares and $I_{max}$ for the black squares (as opposed to using one intensity image obtained with an RGB2GRAY conversion) minimally impacts the score of the actual target. Alternately, for random candidates, which are not necessarily black and white, the scores are lowered significantly. The same applies for the minimum (min) and maximum (max) operators in the final score formula, assuming the two white squares and the two black squares have the same brightness.

To perform the score calculation efficiently for all image pixels, integral images are used to quickly obtain the sum of each of the four squares S1-S4 around each pixel. An integral image representation is obtained by the following calculation for each pixel with coordinates x,y in the image:

$$I(x, y) = \sum_{\substack{x' \leq x \\ y' \leq y}} i(x', y')$$

The above calculation can be performed efficiently in a single pass on the image pixels. Using this representation allows one to obtain the sum of any arbitrary area in the image with only 4 addition and subtraction operations.

Another important factor in the design of the pattern, is that the four squares S1-S4 allow for detection of the target 108/108'/702 by the robot 100 at all distances up to the maximal detection distance, without having to perform the detection at multiple scales. When the robot 100 is close to the target 108/108'/702, each detection square S1-S4 covers only a small part of the pattern squares S1 and S4, allowing for sufficient detection by the camera 258 of the robot 100.

Candidate Evaluation

The process moves to block 602b, where candidate evaluation occurs. The candidate evaluation process evaluates the list of the generated target candidates (generated by the process of block 602a and discussed above), and by determining whether each one of the generated target candidates is the actual target. This process of candidate evaluation uses a corner detection algorithm to detect the pattern corners, represented as C1-07 in the pattern 702 of FIG. 7C. The algorithm then again verifies that the geometric layout of corners C1-07 matches the predetermined target pattern, stored on storage/memory 304.

The candidate detection algorithm, of block 602b, is performed, for example, by six processes, as shown in FIG. 6C. Initially, at block 602b-1, corner detection is performed by using a Harris & Stevens corner detection in the area around the detected candidate (the detection peak points to the center of the target). Next, at block 602b-2, a sub-pixel refinement of the detected corners is performed. Processes suitable for this sub-pixel refinement include, for example open-source processes, such as the "cornersubpix" process that forms part of the OpenCV programming library (available at: opencv.org), which provides a number of processes for computer vision, and is listed in:

http://docs.opencv.org/trunk/modules/imgproc/doc/feature detection.html#cornersubpix, which is incorporated by reference herein.

Figure 7C:
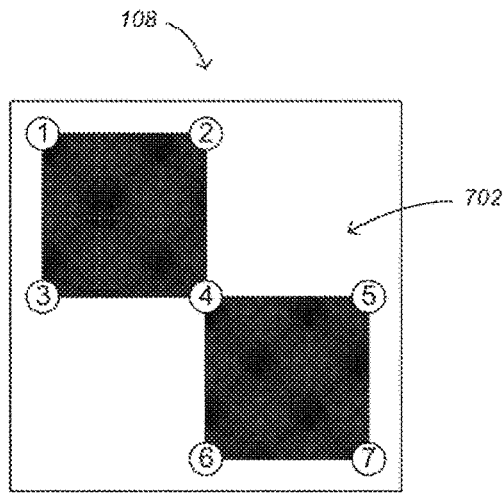

By examining the list of points detected near the candidate center, the target size in the image is estimated, at block 602b-3, and then, by determining the x and y offsets from the center, at block 602b-4, classifying each of the corners in the area to one of the seven target corners C1-C7, as shown in FIG. 7C. The process moves to block 602b-5, where should at least one corner have been classified to each group, take the corner nearest to the center from each group, and assume those seven corners C1-C7 are the seven marker corners C1-C7, at block 602b-6. Otherwise, this candidate is discarded at block 602b-7. From either of block 602b-6 or block 602b-7, the process moves to block 604.

Turning back to block 606a, and FIG. 6D, there is detailed a process for detecting a location of the camera 258 in the robot 100 with respect to the marker 108, so that the robot 100 determines its position with respect to the marker 108 and thereby, the charging station 101.

Determining Camera Location

The camera location and azimuth relative to the target center are determined from the seven target corners C1-C7 of FIG. 7C. This solution also provides an error measure which is used to reject false target detection, as in the vast majority of cases their pattern will only resemble the target pattern but will not be exactly the same.

The process for determining camera location begins at block 606a-1 where a direct calculation of an approximate camera matrix is performed. This occurs as world coordinates of target points $\{X_i = (x_i, y_i, z_i)\}$, and image coordinates of target points $\{x_i = (u_i, v_i)\}$ are determined. A camera matrix P is approximated, which minimizes the reprojection error of the target points on the image, defined as $\Sigma_i(\hat{x}_i - x_i)^2$, where $\hat{x}_i$ is the camera matrix P projection of the world point $X_i$ on the image.

The solution assumes a planar target and a camera with known internal camera calibration K and known distortion parameters, allowing a DLT (direct linear transform) approximation of a 3×3 homography between $\{X_i\}$ and $\{x_i\}$, which is then expanded to a 3×4 camera matrix P using properties of a rotation matrix.

The process moves to block 606a-2, where a non-linear optimization of the solution is performed. This process begins as an internal camera calibration K is assigned and an estimated camera matrix P=K [RT] is decomposed to the rotation matrix R and the translation vector T.

These camera parameters R and T are used as the initial estimation for a non-linear Levenberg-Marquadt minimization of the reprojection error, that yields the final camera matrix.

Finally, the camera location and heading are calculated from the parameters of the camera matrix, in accordance with the geometries of FIG. 5.

Figure 8:
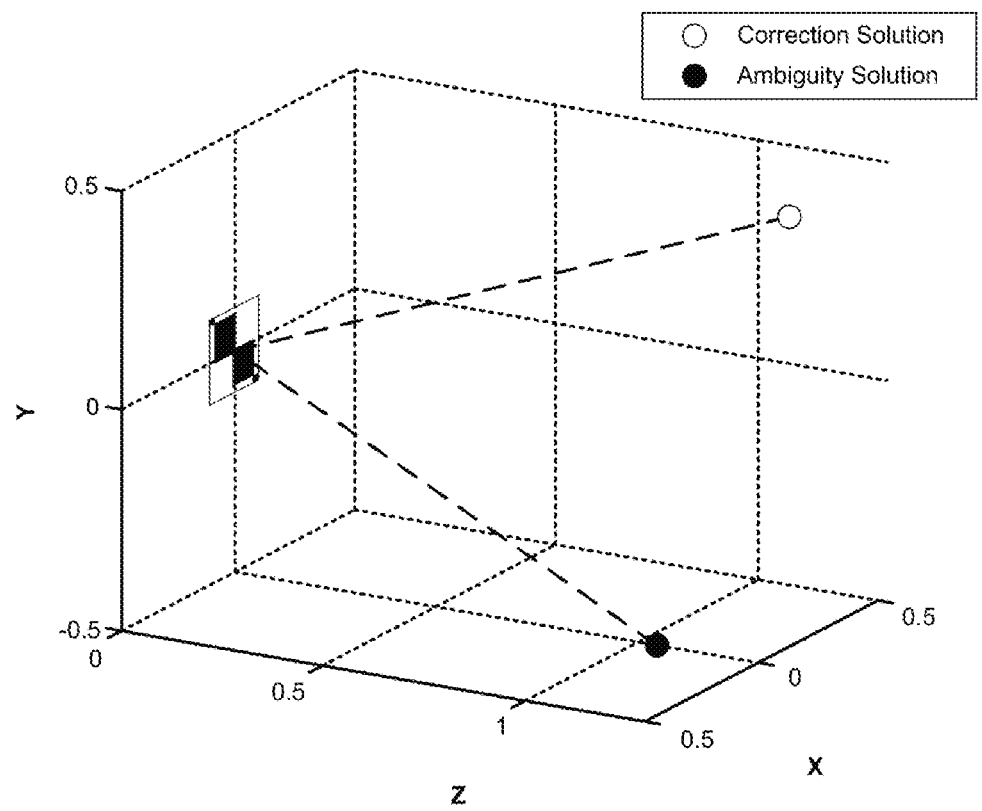
FIG. 8 is a diagram of resolving camera ambiguity in accordance with embodiments of the present invention.

The process moves to block 606a-3, where camera location ambiguity is resolved. Camera location ambiguity must be resolved since points that lie on the same plane (as is the case with a flat target) result in another local minima solution in addition to the correct global solution. This solution has roughly the same Z coordinate, and roughly opposite X, Y coordinates, as shown in FIG. 8.

Without the presence of noise, it is possible to determine which of the two solutions is correct. But in real world scenarios, due to even small errors in the estimation of the corner locations C1-C7, it can be difficult to determine which solution is correct. In order to overcome this problem, the target 108/108'/702 may be arranged facing upward at a small angle. Assuming the ground is relatively flat, this will allow choosing the correct solution out of the two possible solutions.

A number of alternative processes for determining the camera location will be apparent to those skilled in the art; for instance, the camera location may be determined by using a solvePnP function, again from the OpenCV programming library (available at: opencv.org), as run and executed by the CPU 302, and described at:

http://docs.opencv.org/modules/calib3d/doc/camera_calibration_and_3 d_reconstruction.html#solvepnp Base Station Calibration As noted above, the calibration of the second navigation system 140 using the first navigation system 130 may be carried out when the robot 100 is docked at, or in the vicinity of the base station 101. A calibration performed when the robot 100 is docked at the base station 101 may be termed a "base station calibration". Such "base station calibrations" may be carried out as part of an initialization process for the robot when the overall system is first installed, or may be carried out each time the robot 100 docks with the base station 101.

As also noted above, when the robot 100 is docked at the base station 101 the risk of the robot 100 getting "lost" is, of course, very small. In addition, when the robot is docked at the base station 101 its camera 258 will typically have a clear view of the marker 108 and, accordingly, the estimate of the robot's position and/or orientation from the first navigation system 130 may have high accuracy.

The "base station" calibration may include refining the second process 322 (the process by which the CPU 302, as part of the second navigation system 140, determines the robot's position and/or orientation) so that the estimate of the robot's orientation provided by the second process 322 is set to be equal to the estimate of the robot's orientation provided by the first process 321 (the process by which the CPU 302, as part of the first navigation system 130, determines the robot's position and/or orientation). For example, when the robot is docked at the base station, where the first, marker-based navigation system 130 indicates that the robot is oriented at 185 degrees with respect to the normal direction to the surface of the marker 108/108', the "base station calibration" may include altering the second process 322 such that the second navigation system also gives an estimate of 185 degrees for the robot's orientation. In this example, the second process may determine the robot's orientation relative to the base station.

In another example, the second process may determine the robot's orientation relative to some absolute direction, such as True North. Thus, where the first, marker-based navigation system 130 indicates that the robot is oriented at 185 degrees with respect to the normal direction to the surface of the marker 108/108', the "base station calibration" may include altering the second process 322 such that the second navigation system also gives an estimate that is offset from 185 degrees by a predetermined amount, which corresponds to the difference between the normal direction to the surface of the marker 108/108' and True North.

While in the above description and examples the refinement of how the second process 322 determines the robot's orientation has been discussed, the "base station" calibration may equally include refining how the second process 322 determines the robot's position.

Depending on the specific configuration of the robot 100 and docking station 101, the position that the robot adopts with respect to the base station 101 when docked may vary only a small amount, for example by only 1-2 cm. Therefore, in some embodiments, the robot may simply alter the second process 322 such that its estimate of the robot's position is set to be equal to a predetermined value when it is docked at the base station 101. For example, the second navigation system 140 might be "zeroed", so that the robot's position, according to the second navigation system 140, is set to be the origin when it docks at the base station 101. It might also be set to be equal to some other known co-ordinate, for example in a different co-ordinate system, such as an absolute co-ordinate system. Specifically, where the absolute co-ordinate of the base station 101 is known (e.g. if the base station 101 includes a GPS receiver, or the like) the estimate from the second process might be set to be offset from this known co-ordinate by a predetermined amount corresponding to the offset expected for the robot 100 from the base station 101 when docked. As the value of this offset may be inherent in the robot's construction, it might be stored in the storage/memory 304 during manufacture, for example.

In another example, the robot itself may include a GPS, or other satellite positioning system receiver forming part of an additional navigation system for the robot. The position value from this navigation system may be time-averaged to increase its accuracy, with this time-averaged value being stored and used later to transform the position and orientation determined by the second navigation system 140 into universal co-ordinates (e.g. UTM co-ordinates).

In some embodiments, the robot 100 may alter the second process 322 such that its estimate of the robot's position is set to be equal to the estimate of the robot's position provided by the first, marker-based navigation system 130. The second process 322 might in some cases be altered such that its estimate of the robot's position is set to be offset from said first estimate of the robot's position by a predetermined amount. For example, the offset may correspond to the position of the base station 101 in an absolute co-ordinate system.

The alteration, or refinement of the second process 322 in such "base station calibrations" may, in some cases, involve simply including an offset in the second process 322. This offset may, for example, be calculated by comparing the estimate produced by the first process 321, while the robot 100 is docked at the base station 101, with that produced by the second process 322.

Movement Pattern Calibration

A further class of calibration will now be described with reference to FIGS. 9A-9C. A calibration in this class may include the robot executing or performing a specific movement pattern and will therefore be termed "movement pattern calibrations". It may be desired that such "movement pattern calibrations" are carried out in the vicinity of the base station 101 so as to reduce the risk of the robot getting "lost". Such "movement pattern calibrations" may be carried out as part of an initialization process for the robot when the overall system is first installed. More particularly, the robot may carry out a number of such "movement pattern calibrations", each involving a different movement pattern.

Figure 9A:
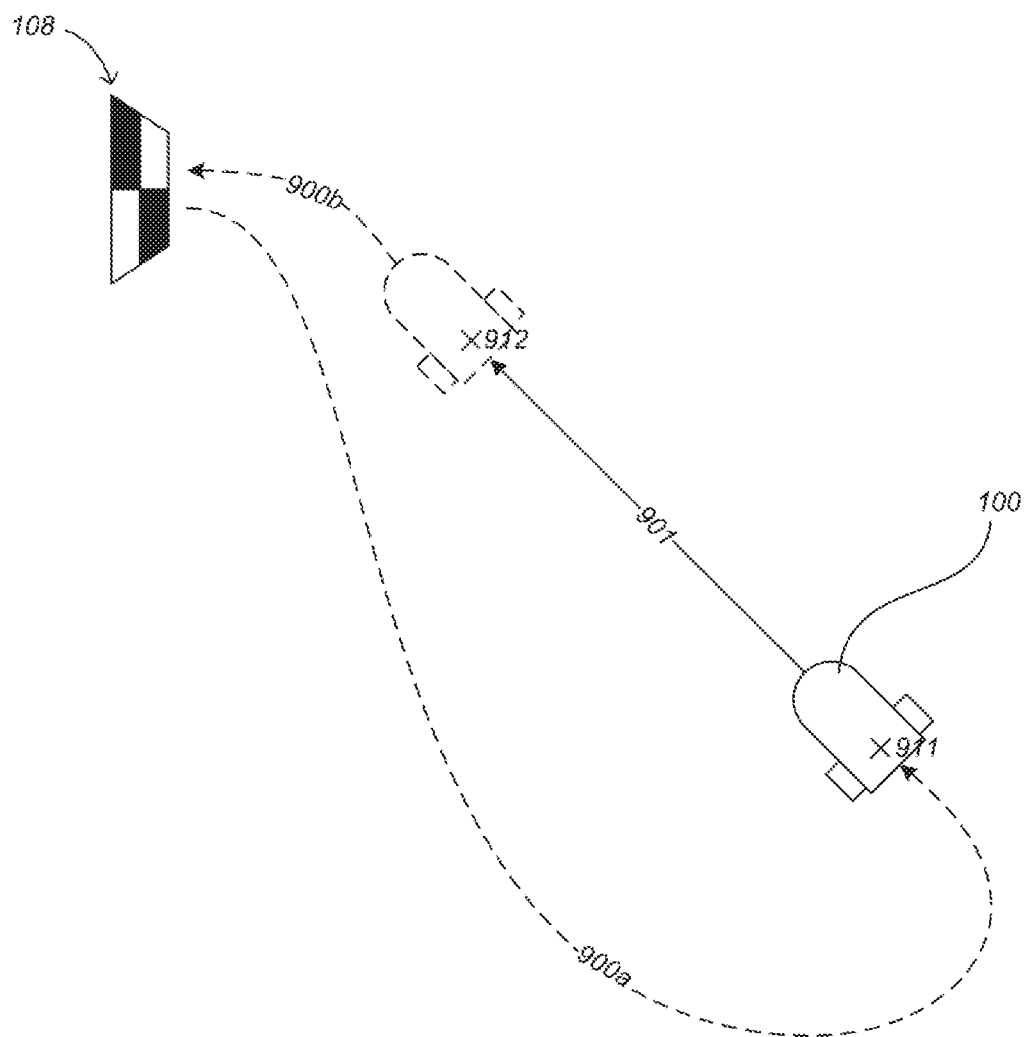
FIG. 9A-9C illustrate examples of "movement pattern calibrations" that may be carried out by a robot in accordance with embodiments of the present invention.

FIG. 9A illustrates a first example of a "movement pattern calibration". As may be seen, the robot 100 departs from the base station, where marker 108 is located, and moves along a path 900a to a first location 911 a short distance from the base station 101. At this first location 911, the marker 108 is visible to the camera 258, so that the first navigation system 130 can, using the first process 321, determine an estimate of the robot's position and/or orientation with respect to the base station 101. Also while at the first location 911, the second navigation system 140 may determine an estimate of the robot's position and/or orientation using second process 322. The robot may then perform movement pattern 901, which, as shown in FIG. 9A, is a straight line having a specific, predetermined length L.

Having travelled this predetermined length, the robot arrives at a second location 912. At the second location 912, the marker 108 is visible to the camera 258, so that the first navigation system 130 can again, using the first process 321, determine an estimate of the robot's position and/or orientation with respect to the base station 101. The first and second locations 911, 912 may be chosen such that the marker 108 is visible to the camera at both points. At the second location 912, the second navigation system 140 also determines an estimate of the robot's position and/or orientation using second process 322.

The CPU 302 then calculates the change in the robot's position and/or orientation, using the values provided by the first process 321 (and thus first navigation system 130) and, similarly, the change in the robot's position and/or orientation, using the values provided by the second process 322 (and thus second navigation system 140). The second navigation system is then calibrated by comparing the changes in position and/or orientation as determined using the two processes 321, 322. For example, the change in position and/or orientation as determined by the first process 321 (and thus first navigation system 130), may be assumed to be correct. Accordingly, the second process 322 may be altered/refined so that, if the movement pattern were repeated, the second process 322 would determine values for the change in position and/or orientation that were closer to those determined by the first process 321. This might, for example, involve the inclusion of a scaling factor in the second process 322, or the alteration of an existing scaling factor (e.g. an adjustment parameter, as discussed above in the "measurement error calibrations" section).

A "movement pattern calibration" of the kind shown in FIG. 9A may, in particular, refine the way in which the second process 322 determines the position of the robot 100 (though it is envisaged that other movement pattern calibrations may also refine the way in which the second process 322 determines the position of the robot 100). For example, where the second navigation system 140 includes sensors operable to sense relative motion of the robot, the way in which signals are processed from sensors operable to sense changes in the position of the robot may be altered/refined. Two examples of such sensors operable to sense changes in the position of the robot are an odometer and an accelerometer.

Where the robot navigates along path 901 based on the estimate of the robot's position and/or orientation provided by one of the first 130 and second 140 navigation systems, the change in position as determined using the values from that navigation system may, by definition, indicate that a distance of exactly L has been travelled. In some cases, it may be beneficial to navigate along path 901 based on the estimate of the robot's position and/or orientation provided by the second 140 navigation system, as the robot may not get "lost" if the marker 108 is not visible. While in many cases it is possible to plan the movement pattern such that the marker may be expected to be visible, there still exists the possibility that the marker 108 may unexpectedly be obscured, for example by an object that the robot 100 is not aware of.

The same factors may apply with movement patterns more generally. Thus, in embodiments where a "movement pattern calibration" is carried out, for substantially the whole of the movement pattern, the robot may navigate using the second navigation system 140.

Returning to the example shown in FIG. 9A, having calibrated the second navigation system 140 as described above, the robot may then return to the base station 101, travelling along path 900b. The marker 108 provided on the base station 101 may assist the robot in navigating back to the base station, as will be explained in further detail below. Alternatively, the robot may carry out additional "movement pattern calibrations", such as those illustrated in FIGS. 9B and 9C, before returning to the base station 101.

Figure 9B:
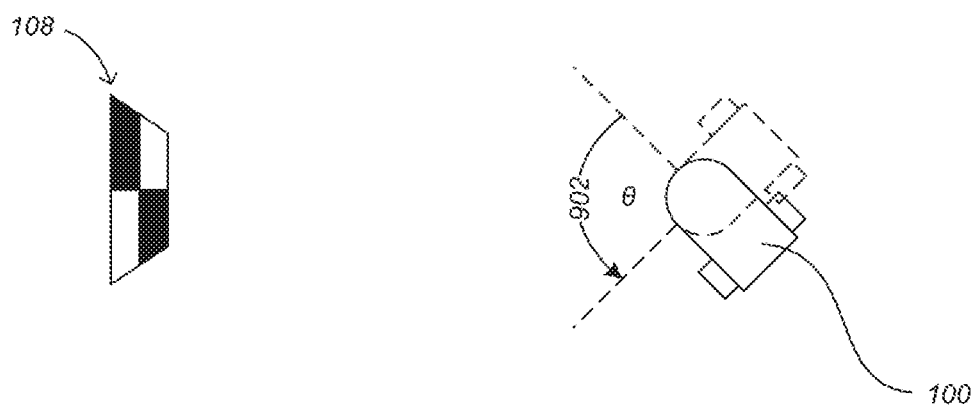

Attention is now directed to FIG. 9B. As may be seen, in the "movement pattern calibration" depicted in FIG. 9B the robot performs movement pattern 902, where it turns through a predetermined angle θ. As shown in the figure, the robot may remain in substantially the same location while performing this turn. The angle θ may be chosen so that the robot 100 moves through the maximum angular range over which the marker 108 is visible to the camera 258.

A "movement pattern calibration" of the kind shown in FIG. 9B may, in particular, refine the way in which the second process 322 determines the orientation of the robot 100. For example, where the second navigation system 140 includes sensors operable to sense relative motion of the robot, the way in which signals are processed from sensors operable to sense changes in the orientation of the robot may be altered/refined. Two examples of such sensors operable to sense changes in the orientation of the robot are a compass/magnetometer and a gyroscope.

In a compass/magnetometer, the error may vary according to the absolute angle it is oriented at. It may therefore be beneficial for the robot, as part of the movement pattern, to move through the maximum angular range over which the marker 108 is visible to the camera 258.

In a gyroscope, there may be a scaling error and integration drift. The integration drift can, in some cases, be derived by measuring it over time when the robot 100 is not moving. However, in some cases the drift can be different during movement. Hence, it may be beneficial to measure the drift while the robot is turning. To minimize the scaling error, the robot can rotate several turns in one direction and then the same number of turns the other direction. This may reduce the scaling error (which is proportional to the absolute angle) but keep the drift error.

To measure the scaling error, the robot may be moved between 2 angular positions, as different as possible (still within the range the marker is detectable). After compensating for the previously measured drift, the scaling can be derived by comparing the angular difference, as determined using the first process 321 and the first, marker-based navigation system 130, to that determined using the second process 322 and second navigation system, which includes the robot gyroscope.

Having calibrated the second navigation system 140 using the movement pattern shown in FIG. 9B, the robot may then return to the base station 101; as noted above, the marker 108 provided on the base station 101 may assist the robot in navigating back to the base station. Alternatively, the robot may carry out additional "movement pattern calibrations", such as those illustrated in FIG. 9A (in particular, where not already carried out) and FIG. 9C, before returning to the base station 101.

Figure 9C:
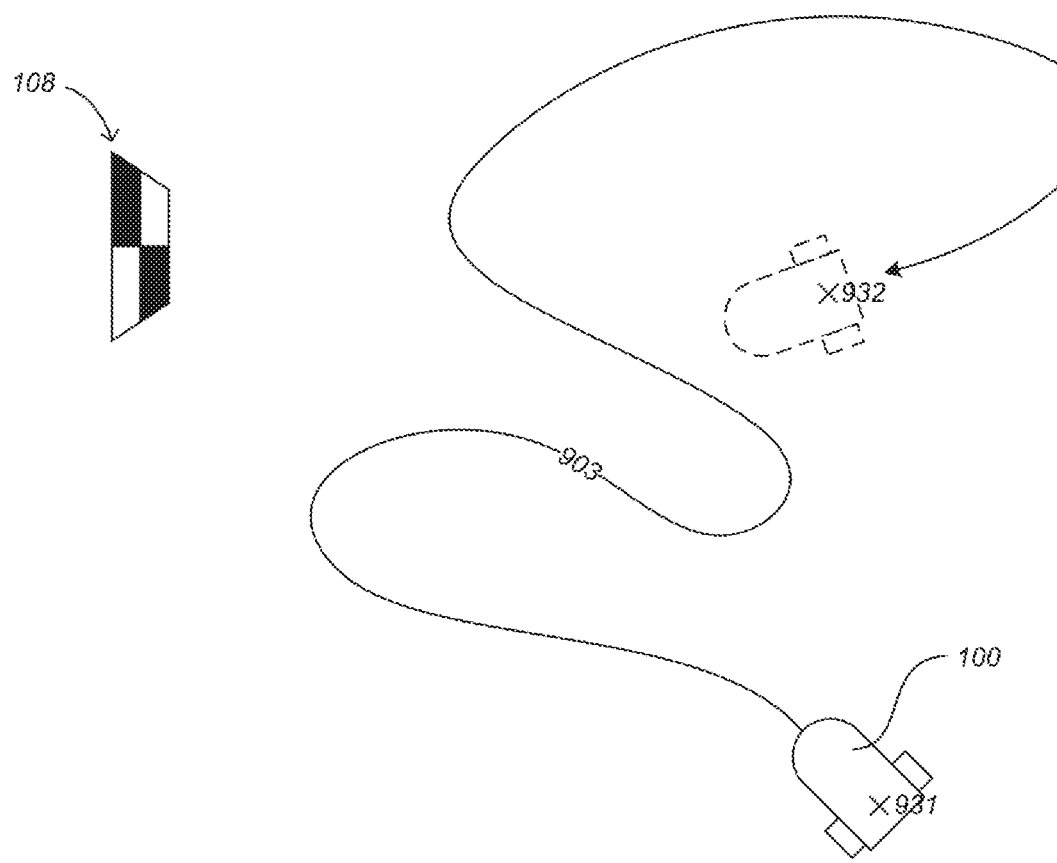

Attention is therefore now directed to FIG. 9C. As may be seen, in the "movement pattern calibration" depicted in FIG. 9C the robot performs movement pattern 903, where it moves along a more complex path, which includes a number of turns. In the robot's initial location 931 at the start of movement pattern 903, the marker 108 is visible to the camera 258. Similarly, at location 932 at the end of movement pattern 903 the marker 108 is again visible to the camera 258. However, as a result of the turns executed during the movement pattern 903, the marker 108 may not be visible for the whole of the movement pattern 903.

A "movement pattern calibration" of the kind shown in FIG. 9C may refine the way in which the second process 322 determines the position/or and orientation of the robot 100 (though other movement pattern calibrations may also refine the way in which the second process 322 determines the position/or and orientation of the robot 100). Movement patterns similar to that shown in FIG. 9C may be used to calibrate the entire second navigation system 140.

In more detail, having reached the end of movement pattern 903, with the marker 108 visible to the camera 258, the CPU 302, using first process 321 and first navigation system 130, determines an estimate of the robot's position and/or orientation relative to the base station 101. Similarly, the CPU 302, using second process 321 and second navigation system 140, determines an alternative estimate of the robot's position and/or orientation. The second navigation system 140 is then calibrated by comparing these estimates for the robot's position and/or orientation from the two navigation systems 130, 140. For example, the angular and position error may be projected linearly over the whole of the path of movement pattern 903.

Further, where the robot includes an additional navigation system that utilizes a satellite positioning system receiver, a movement pattern such as that shown in FIG. 9C, which includes changes in the position and orientation of the robot, may be used to determine the relationship between the local co-ordinate system based on the marker 108 and a universal co-ordinate system (e.g. UTM). This may be important as, typically, a satellite positioning system receiver is not capable of determining orientation, However, by determining the position of the robot at several points on the path using both the first, marker-based, navigation system 130 and the navigation system using the satellite positioning system receiver, it is possible to determine the transformation between the local co-ordinates of the marker-based navigation system may be transformed into universal co-ordinates. In effect, the marker-based navigation system then acts as a very accurate compass for the robot.

Returning to the Base Station Using Markers

As noted above, the markers and processes described above, such as those described with reference to FIGS. 6B-6D, 7 and 8, may be utilized to assist the robot in returning to the base station 101.

Figure 10:
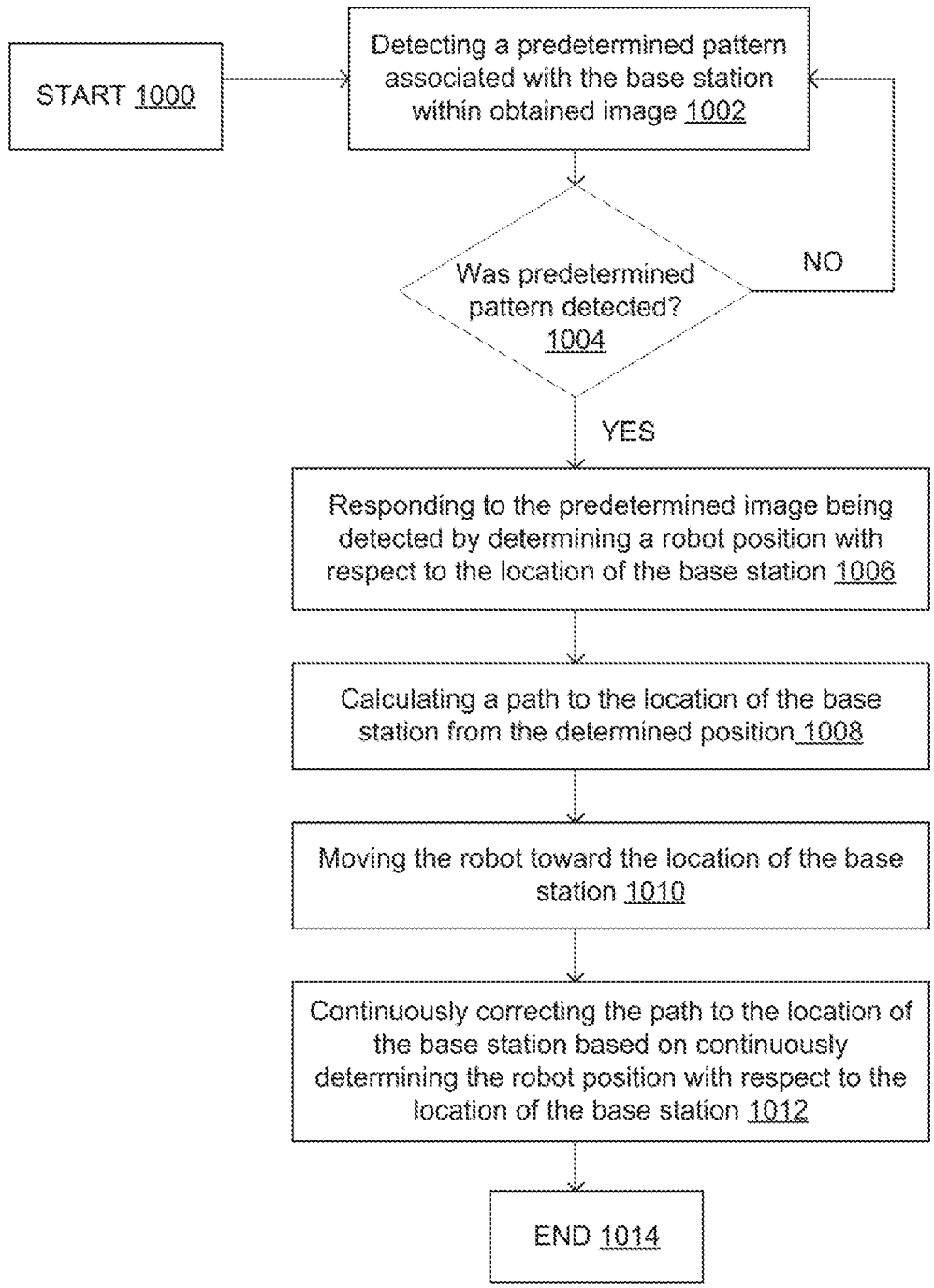
FIG. 10 is a flow diagram of a process by which the robot returns to the base station with the aid of a marker.
Figure 11A:
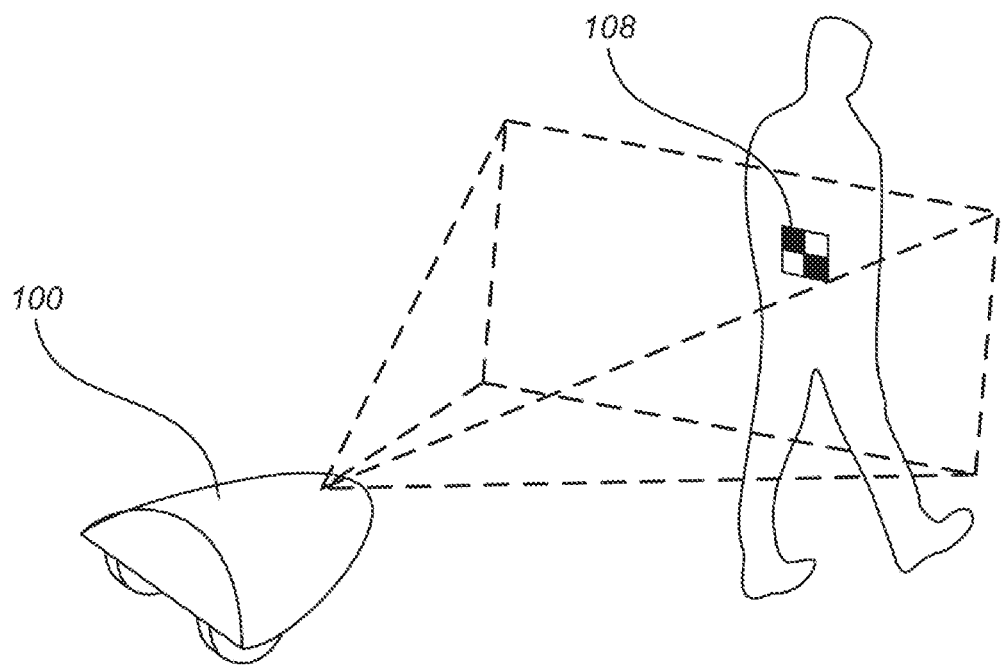
FIGS. 11A-11B illustrate a user carrying a marker so as to teach the robot a particular pathway.
Figure 11B:
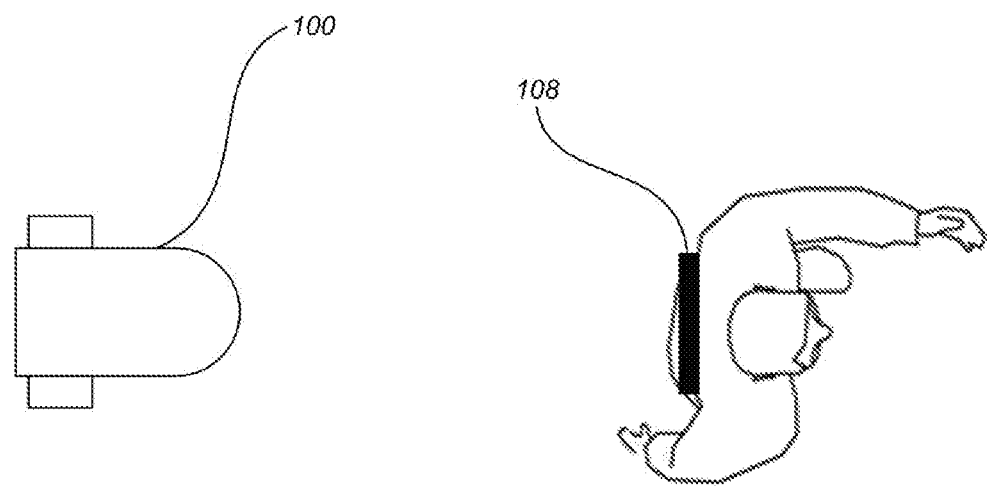

In this regard, attention is directed to FIG. 10, which shows a flow diagram detailing a computer-implemented process for returning the robot to the base station 101. The process and subprocesses of FIG. 10 are computerized processes performed by the control system 120, and the various systems and components of the robot 100. The aforementioned processes and sub-processes are, for example, performed automatically and in real time.

The process begins at the START block 1000. At this time, the robot 100 needs to return to the charging station 101 from its present position. This decision to return to the charging station 101 is made by the CPU 302 in response to one of more signals for conditions including: 1) robot 100 operation is complete (the area within the boundary marker, e.g., perimeter loops 107, has been worked); 2) robot 100 battery voltage reaches (drops to) a predetermined threshold; 3) a predetermined time for operation has expired; 4) a problem in the robot 100 itself is detected; 5) an obstacle has been contacted; 6) the robot 100 has performed a calibration of its second navigation system 140 using its first, marker-based navigation system 130, as described above; or 7) another preprogrammed condition has occurred.

With the robot 100 needing to return to the charging station 101, the process moves to block 1002. At block 1002, CPU 302 signals the drive system to move the drive wheels 28 of the robot 100 so that the predetermined image, for example, the marker 108 associated with, for example, on the charging station 101, can be detected by the image processing system of the robot 100, this detection including determining whether the detected pattern matches a predetermined target pattern, for example, in accordance with rules and policies for determining a match. The predetermined target pattern is, for example, stored in storage/memory 304. The processes for detecting the marker described above with reference to FIGS. 6B and 6C may be utilised as part of the process at block 1002.

At block 604, if a match was not determined, the process returns to block 602. Should a match have been determined, the process moves to block 1006.

With the predetermined image, e.g., the marker 108, detected, the process moves to block 1006, where the CPU 302 of the robot 100 responds to the detection of the predetermined image by determining the position of the robot 100 with respect to the location of the charging station 101. The process for determining the position of the robot 100 with respect to the location of the charging station 101 described above with reference to FIG. 6D may be utilised as part of the process at block 1006.

The CPU 302 then calculates a path to the location of the charging station 101, originating from the determined position of the robot 100, at block 1008. The CPU 302 then signals the drive system 228 to move the robot 100 toward the location of the charging station 101, and ultimately, into the charging station 101, at block 1010. Movement into the charging station 101 by the robot 100, concludes, for example, with docking via an electrical connection between the robot 100 docking contacts 202 and a corresponding transmission part 102 of the charging station 101, for battery charging.

On the pathway from the robot 100 beginning its movement to the charging station 101, through docking, the CPU 302, drive system 228a, and drive wheels 228 are cooperatively operating to continuously correct the path to the charging station 101, with respect to the location of the charging station 101, at block 1012. With the docking complete, for example, the CPU receiving a signal of an electrical contact between the docking contact(s) 202 of the robot 100 and the transmission part of the charging station 101, the process ends, at block 1014. While certain of the foregoing embodiments refer to a marker that is provided at a charging station, it should be appreciated that such markers could be provided at other suitable destinations for the robot. In such embodiments, the robot (and specifically the CPU thereof) would detect a predetermined pattern associated with the destination for the robot from at least one of the obtained images; respond to the detected predetermined pattern being the pattern associated with that destination by determining a robot position with respect to the location of that destination; and, calculate a path to that destination from the determined position.

Teaching a Robot a Trail Using Markers

The markers and processes described above may also be utilized more generally to assist in navigation by a robot.

FIGS. 11A, 11B, 12 and 13 therefore illustrate another use of a marker 108 similar to that depicted in FIG. 4A, for example. The system of FIGS. 11A, 11B, 12 and 13 includes a robot 100 such as that described above with reference to FIGS. 3A-3C. As may be seen from FIGS. 11A and 11B, the marker 108 is held or worn by the user and is visible to the camera 258 of the robot 100 (the field-of-view of the camera 258 is indicated by the dashed lines in FIG. 11A).

In this embodiment, the robot (and more specifically, the CPU 302) is programmed to operate in a "trail recording mode", where the marker 108" is moved around a pathway 1210, with this pathway, or trail being recorded by the robot. The robot 100 may enter this "trail recording mode" in response to an instruction from the user. Such an instruction might be given using a control device that may plug directly into the robot 100 or communicate wirelessly with the robot 100, or a control pad on the robot 100. In some implementations, the control device may be a smartphone.

Figure 12:
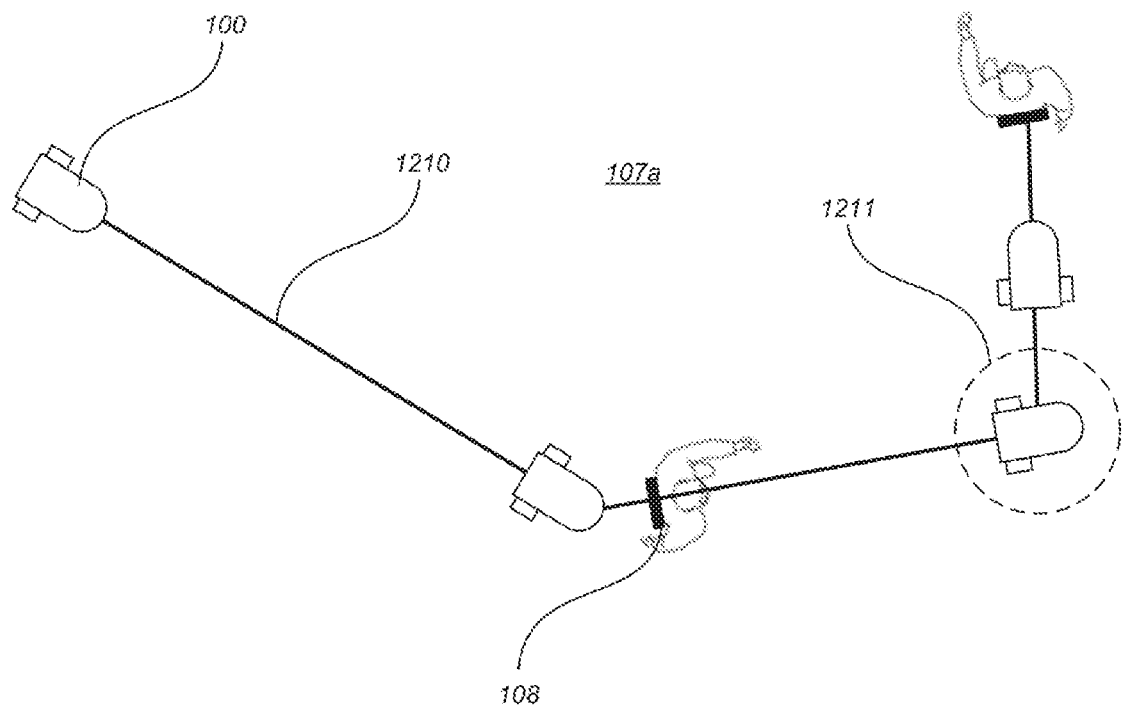
FIG. 12 illustrates a first example of the robot being taught a pathway, where the robot moves along the same path as the marker.
Figure 13:
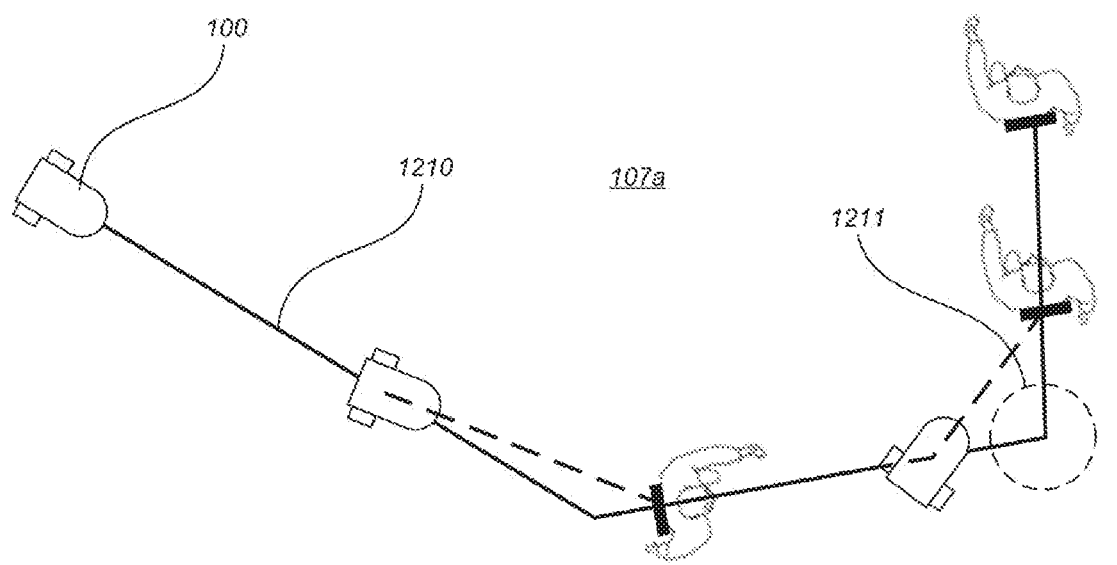
FIG. 13 illustrates a second example of the robot being taught a pathway, where the robot seeks to move towards the marker's current position.

In the example shown in FIG. 12, the user carries the marker 108 along a pathway 1210 and, as shown in FIG. 12, the robot 100 tracks the marker 108 and moves along the same pathway 1210 (also known as a trail): the robot follows the path taken by the marker 108 a short time before, rather than following the currently detected position of the marker 108 instead. The approach in FIG. 12 may therefore be contrasted with that of FIG. 13, where the robot seeks to move towards the currently detected position of the marker 108. Thus, in FIG. 12, the robot will not take a shorter route to the marker 108, as it does in FIG. 13 (the shorter route being shown in broken lines), but will stay on track covering the pathway 1210.

The co-ordinates of the pathway 1210, may be established by the robot 100 using a first, marker-based navigation system 130 similar to that described above, and a second navigation system 140 and potentially other navigation systems, as also described above. More particularly, the first navigation system may determine the current position (and orientation) of the marker 108, with the second navigation system 140 (and third, fourth etc. navigation systems, where present) enabling the robot 100 to determine its current position, either in absolute co-ordinates, or relative to the base station 101. By combining this information, the robot is able to determine the path 1210 taken by the marker 108 in the appropriate co-ordinate system.

In more detail, as the marker is moved along the pathway 1210, the current coordinates for the robot 100, relative to the marker 108, are obtained from the robot 100 analyzing the images which it obtains, of the marker 108 (in particular, the image of the pattern of the marker 108) as detailed above. In addition, the robot utilizes the second navigation system 140 (and third, fourth etc. navigation systems, where present) to continuously estimate its current co-ordinates within work area 107*a*. These current co-ordinates may be relative to the robot's starting position (which might, for instance, be the docking station) or might be relative to some fixed point in the work area 107*a*, and/or be GPS or other geolocation coordinates.

Using the thus-estimated current co-ordinates of the robot's current position (obtained using the navigation system) and the current coordinates for the robot 100, relative to the marker 108 (obtained from the robot 100 analyzing the images which it obtains of the marker 108), the CPU 302 is able to determine the current co-ordinates of the marker within the work area 107*a*. These co-ordinates are stored by the robot 100 on storage/memory 304, thus saving the pathway 1010 for future reference.

Accordingly, during later navigation within the work area 107*a*, the robot 100 can compare its current position (as estimated using the navigation system) with these stored co-ordinates of the pathway 1210. In one example, the robot may be programmed with a "trail playback" mode, where the robot, with the aid of the navigation system, moves along the recorded pathway 1210. For instance, the CPU 302 may cause the movement system to move the robot such that the navigation system indicates it is at the co-ordinates of the recorded pathway 1210. In another example, the robot may be programmed with an area coverage mode, where it covers the working area 107*a* according to a random or calculated scanning pattern, with the boundary of the working area being defined by the recorded pathway 1210. During this area coverage mode, the robot's payload may be active, for example so that it progressively operates over the whole working area.

There exists the possibility that camera 258 may lose sight of the marker 108 during the "trail recording mode", The risk may be greater with embodiments similar to that of FIG. 12, where the robot seeks to follow the path taken by the marker 108 a short time before, rather than following the currently detected position of the marker 108 instead. For example, when the user makes a sharp turn, such as at point 1211 of the path, by the time the robot has reached the same point, the user—and more particularly the marker 108—may be outside of the field-of-view of the camera 258.

The robot 100 may therefore be programmed so as to signal to the user that the marker 108 is no longer visible to the camera 258. This may, for example, include the robot 100 generating an alarm sound or voice feedback through a speaker provided on the robot. In another example, a notification might be sent (for instance using Bluetooth or Wifi) to a control device held by the user, which could be a smartphone.

It should be noted that a camera 258 with a particularly wide field-of-view, such as a panoramic camera, might also be used to reduce the risk of the marker 108 moving out of sight during the "trail recording mode".

Further, it should be noted that, rather than a user having to hold marker 108, the marker could be attached to, or held on a vehicle that the user guides within the working area.

In other embodiments, rather than following the marker along the pathway 1210, the robot might remain stationary during the "trail recording mode". Hence, the robot would rely just on the current coordinates for the robot 100, relative to the marker 108" obtained from the robot 100 analyzing the images which it obtains of the marker 108". In such embodiments, the robot 100 might turn on the spot to keep the marker 108 within the field-of-view of the camera 258, though this would be of lesser importance where the field-of-view of the camera is particularly large, as discussed above.

Navigation Using Multiple Markers

Figure 14:
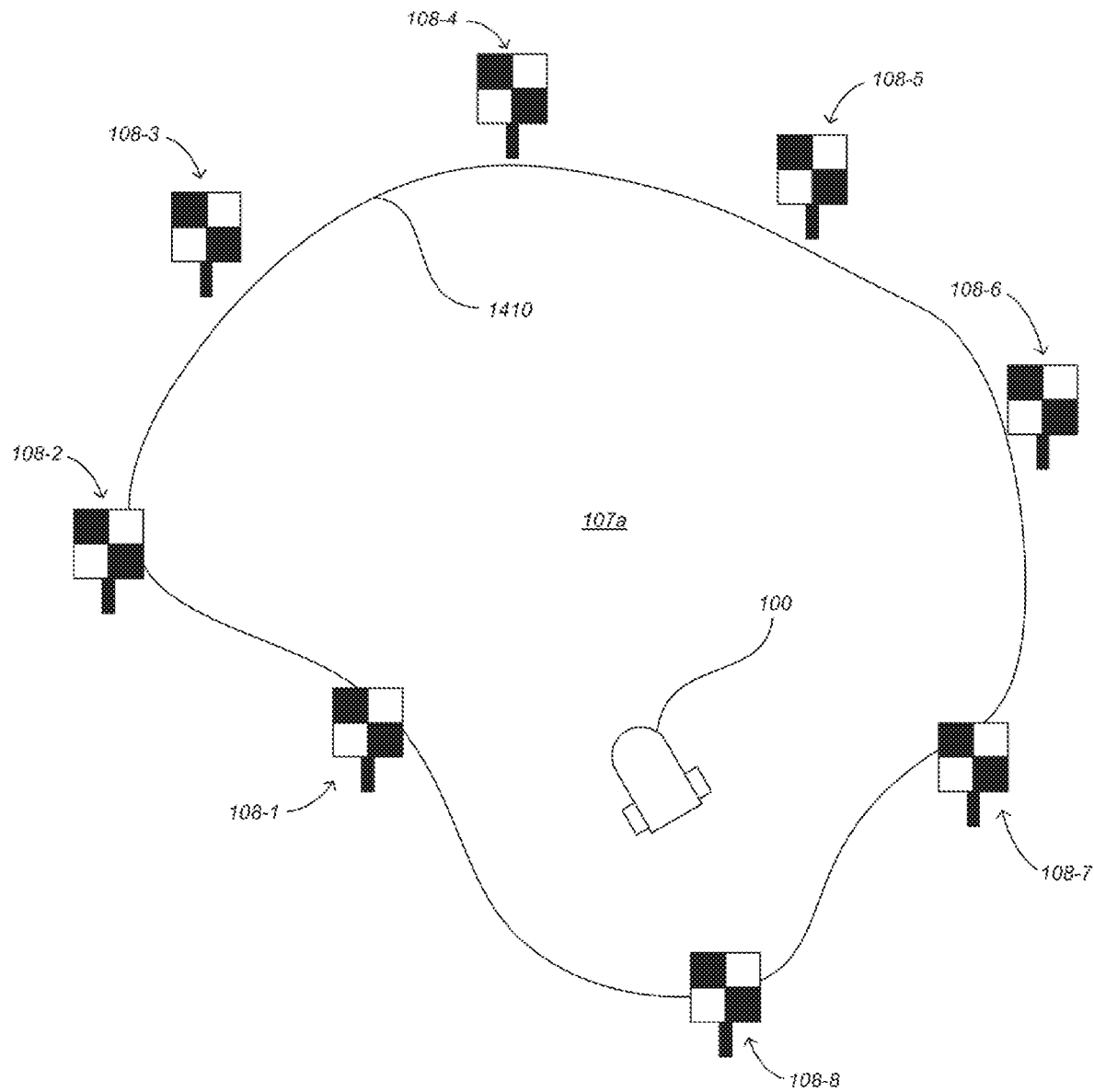
FIG. 14 is a diagram showing a system where a number of markers are used to aid navigation by the robot within a working area.

FIG. 14 illustrates another embodiment for the markers 108-1 to 108-8 (circle 1 to circle 8), also referred to here as marker objects, each located at a known (or registered) position; for example, the position's GPS coordinates are known. The robot 100 is shown in FIG. 14 moving, with the aid of its navigation system along a pathway 1410 whose co-ordinates have been stored by the robot. As may be seen from FIG. 14, this pathway 1410, defines a work area 107*a*, similar to the pathway 1210 and work area 107*a*, as detailed above for FIGS. 12 and 13. It will be appreciated that this pathway 1410 may be recorded in a similar manner to that described above with reference to FIGS. 12 and 13.

When the robot 100 detects one of the markers 108-1 to 108-8, it can identify its position relative to that marker. Further, using the estimate of its current position provided by the navigation system, it can determine which marker it has detected (to this end, it may be desirable that the distance between markers 108-1 to 108-8 is greater than the accuracy of the navigation system). Thus, it is possible for the markers to be identical, as illustrated in FIG. 14, though non-identical markers might also be used in some situations.

Then, having determined which marker has been detected, the robot uses the stored position of that marker and its position relative to that marker, obtained from the robot 100 analyzing the images which it obtains of that marker, to calculate its current position within the working area 107*a*. This calculated position may be used to calibrate the navigation system, particularly where it relies on sensors that detect the relative motion of the robot (such as an inertial measurement unit), which are prone to integration drift. This may be considered as "pinning" the robot's current position using the detected marker and its known position. With a navigation system including sensors that detect the relative motion of the robot, further estimates of the robot's current position may be made relative to this "pinned" location.

Hence, or otherwise, the estimate of the robot's current position provided using the navigation system may be updated with a position calculated using the thus-determined robot position with respect to the detected marker object and its stored position.

As may be seen, the markers 108-1 to 108-8 shown in FIG. 14 are disposed at various points outside of the work area 107a' in the proximity of the boundary 1410. This may assist the robot in navigating in the work area 107a', since it is likely to have at least one marker close to its current position and within its field-of-view, but is unlikely to collide with the marker objects. However, markers might alternatively (or in addition) be provided within islands within the work area where the robot is not permitted to move.

It should be appreciated that in other embodiments using similar "pinning" approaches, the robot might move along a pathway that did not define a work area. Indeed, the robot might use the markers for such "pinning" when operating in an area coverage mode, where it covers the working area 107a according to a random or calculated scanning pattern, with the boundary of the working area 107 being defined by the recorded pathway 1010. Or, moreover, the robot might use the markers for such "pinning" when navigating within the working area 107a generally.

It will be appreciated that the marker described above with reference to FIGS. 4A-B and 5 may be utilized in the embodiments of FIGS. 11A-B, 12, 13 and 14 (in FIG. 14, a number of identical such markers may be used). In addition, the processes for detecting the pattern of the marker within obtained images and for determining the robot's position relative to the marker, as described above with reference to FIGS. 6 and 7 and 8 may also be utilized in the embodiments of FIGS. 11A, 12, 13 and 14.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the control system 120, as a stand-alone software package, partly on the control system 120 and partly on a remote computer or entirely on the remote computer or server. In the latter scenario, the remote computer may be connected to the control system 120 through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the control system 120 or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto the control system 120, other programmable data processing apparatus, or other devices to cause a series of operational steps to be performed on the control system 120, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A domestic robotic system including a robot, the robot comprising:
    a movement system, comprising a drive system and one or more moveable elements, the drive system being configured to drive said one or more moveable elements so as to move the robot over a surface;
    an image obtaining device for obtaining images of the exterior environment of the robot; and,
    at least one processor in electronic communication with the movement system and the image obtaining device, the at least one processor programmed to:
    detect a predetermined pattern within at least one of the obtained images, the predetermined pattern being associated with a marker provided on a base station;
    respond to the detection of the predetermined pattern by determining, by a first process, a first estimate of at least one of a position and an orientation of the robot, said first estimate of the at least one of the position and orientation of the robot being relative to the base station, the at least one processor and image obtaining device thereby forming at least part of a first navigation system for the robot;
    determine, by a second process, an alternative estimate of said at least one of the position and orientation of the robot, the at least one processor thereby forming part of a second navigation system for the robot; and,
    perform at least one calibration of said second navigation system using said first navigation system, wherein the at least one processor is programmed such that said at least one calibration includes a base station calibration that takes place when the robot is docked at said base station.

2. The domestic robotic system of claim 1, wherein said alternative estimate of said at least one of the position and orientation of the robot is relative to the base station.

3. The domestic robotic system of claim 1, wherein the robot additionally comprises:
    one or more sensors in electronic communication with the at least one processor, the at least one processor receiving output from said one or more sensors to determine, by said second process, said alternative estimate of at least one of the position and orientation of the robot, said one or more sensors thereby forming a part of said second navigation system.

4. The domestic robotic system of claim 3, wherein said one or more sensors forming said part of said second navigation system are configured to sense relative motion of the robot.

5. The domestic robotic system of claim 1, wherein said at least one of the position and orientation of the robot comprises the orientation of the robot, and wherein said base station calibration comprises refining the second process such that said alternative estimate of the orientation of the robot is either set to be equal to said first estimate of the orientation of the robot relative to the base station or is set to be offset from said first estimate of the orientation of the robot by a predetermined amount.

6. The domestic robotic system of claim 5, wherein said at least one of the position and orientation of the robot comprises the position of the robot, and wherein said base station calibration further comprises at least one of:
    refining the second process such that said alternative estimate of the position of the robot is set to be equal to a predetermined co-ordinate; and
    correcting the second process such that said alternative estimate of the position of the robot is set to be equal to said first estimate of the position of the robot or is set to be offset from said first estimate of the position of the robot by a predetermined amount.

7. The domestic robotic system of claim 1, wherein the at least one processor is programmed such that said at least one calibration comprises one or more measurement error calibrations, each of which comprises determining values for one or more adjustment parameters, which account for measurement errors that are expected to result from operation of the robot within the working environment, with the one or more adjustment parameters being utilized by said second process.

8. The domestic robotic system of claim 1, wherein the at least one processor is programmed such that said at least one calibration includes one or more movement pattern calibrations, each of which comprises the at least one processor causing the movement system to perform a movement pattern having a corresponding predetermined form.

9. The domestic robotic system of claim 8, wherein at least one of said one or more movement pattern calibrations includes comparing, at each of a plurality of points during the movement pattern, said first estimate of said at least one of the position and orientation of the robot, with said alternative estimate of said at least one of the position and orientation of the robot.

10. The domestic robotic system of claim 8, wherein at least one of said one or more movement pattern calibrations includes comparing a change, as determined by said first navigation system, in said at least one of the position and orientation of the robot between a first point and a second point of the movement pattern, with a change, as determined by said second navigation system, in said at least one of the position and orientation of the robot between said first point and said second point of the movement pattern.

11. The domestic robotic system of claim 10, wherein at least one of said one or more movement pattern calibrations is a path-following calibration, whose corresponding movement pattern includes a path having a predetermined shape that the robot follows.

12. The domestic robotic system of claim 11, wherein for each path-following calibration the corresponding movement pattern comprises a straight line having a predetermined length.

13. The domestic robotic system of claim 11, wherein each path-following calibration refines a procedure by which the second process determines the position of the robot.

14. The domestic robotic system of claim 10, wherein at least one of said one or more movement pattern calibrations is a rotating calibration, whose corresponding movement pattern comprises a rotation of the robot through a predetermined angle.

15. The domestic robotic system of claim 14, wherein each rotating calibration refines a procedure by which the second process determines the orientation of the robot.

16. The domestic robotic system of claim 8, wherein the at least one processor is programmed so as to move the robot, using the movement system, from the base station to a start point, and wherein the robot thereafter performs at least one of the one or more movement pattern calibrations, and thereafter returns to the base station, using the movement system.

17. The domestic robotic system of claim 8, wherein the at least one processor is programmed such that each movement pattern calibration is a measurement error calibration and comprises determining values for one or more adjustment parameters, which account for measurement errors that are expected to result from operation of the robot within the working environment, with the one or more adjustment parameters being utilized by the at least one processor in said second process.

18. The domestic robotic system of claim 17, wherein said least one of the position and orientation of the robot comprises the position of the robot; wherein at least one of said one or more movement pattern calibrations is both a path following calibration, whose corresponding movement pattern includes a path having a predetermined shape that the robot follows, and a measurement error calibration, whose corresponding one or more adjustment parameters are used by the at least one processor in the second process to determine said alternative estimate of the position of the robot.

19. The domestic robotic system of claim 17, wherein said at least one of the position and orientation of the robot comprises the orientation of the robot; wherein at least one of said one or more movement pattern calibrations is both a rotating calibration, whose corresponding movement pattern comprises a rotation of the robot through a predetermined angle, and a measurement error calibration, whose corresponding one or more adjustment parameters that are used by the at least one processor in the second process to determine said alternative estimate of the orientation of the robot.

20. The domestic robotic system of claim 1, wherein the robot further comprises a satellite navigation system receiver, the at least one processor being programmed to determine an estimate of a position of the robot, in universal co-ordinates, using said satellite navigation system receiver, the at least one processor and the satellite navigation system receiver forming at least part of a third navigation system for the robot;
wherein the at least one processor is programmed to use:
said estimate of the position of the robot in universal co-ordinates at two or more different points; and
at least one of said first and second estimates of said at least one of the position and orientation of the robot, at said two or more different points,
to determine a transformation from local co-ordinates, which are used for said at least one of the first and second estimates, and which are relative to the base station, to universal co-ordinates.

* * * * *